(12) United States Patent
Frank et al.

(10) Patent No.: US 8,863,619 B2
(45) Date of Patent: Oct. 21, 2014

(54) METHODS FOR TRAINING SATURATION-COMPENSATING PREDICTORS OF AFFECTIVE RESPONSE TO STIMULI

(76) Inventors: Ari M. Frank, Haifa (IL); Gil Thieberger, Kiryat Tivon (IL); Anat Thieberger Ben-Haim, Tivon (IL)

(*) Notice: Subject to any disclaimer, the term of this patent is extended or adjusted under 35 U.S.C. 154(b) by 460 days.

(21) Appl. No.: 13/168,965

(22) Filed: Jun. 25, 2011

(65) Prior Publication Data

US 2012/0290514 A1 Nov. 15, 2012

Related U.S. Application Data

(60) Provisional application No. 61/484,673, filed on May 11, 2011.

(51) Int. Cl.
*G06F 15/18* (2006.01)
*G06N 99/00* (2010.01)

(52) U.S. Cl.
CPC .................................. *G06N 99/005* (2013.01)
USPC ............................................................ 76/12

(58) Field of Classification Search
None
See application file for complete search history.

(56) References Cited

U.S. PATENT DOCUMENTS

| | | | |
|---|---|---|---|
| 5,676,138 A | 10/1997 | Zawilinski | |
| 6,190,314 B1 | 2/2001 | Ark et al. | |
| 6,309,342 B1 | 10/2001 | Blazey et al. | |
| 7,120,880 B1 * | 10/2006 | Dryer et al. | 715/863 |
| 7,930,199 B1 | 4/2011 | Hill | |
| 8,224,106 B2 | 7/2012 | Bing et al. | |
| 8,234,262 B2 | 7/2012 | Jung et al. | |
| 8,296,172 B2 * | 10/2012 | Marci et al. | 705/7.29 |
| 8,308,562 B2 | 11/2012 | Patton | |
| 8,335,715 B2 * | 12/2012 | Pradeep et al. | 705/14.41 |
| 8,386,257 B2 * | 2/2013 | Irie et al. | 704/270 |
| 8,386,312 B2 * | 2/2013 | Pradeep et al. | 705/14.42 |
| 8,392,253 B2 * | 3/2013 | Pradeep et al. | 705/14.42 |
| 8,392,255 B2 | 3/2013 | Pradeep et al. | |
| 8,407,055 B2 * | 3/2013 | Asano et al. | 704/270 |
| 8,484,081 B2 | 7/2013 | Pradeep et al. | |
| 8,682,649 B2 * | 3/2014 | Bellegarda | 704/10 |
| 2003/0093784 A1 * | 5/2003 | Dimitrova et al. | 725/10 |
| 2005/0289582 A1 * | 12/2005 | Tavares et al. | 725/10 |
| 2007/0066916 A1 * | 3/2007 | Lemos | 600/558 |
| 2007/0162505 A1 | 7/2007 | Cecchi et al. | |
| 2008/0065468 A1 * | 3/2008 | Berg et al. | 705/10 |
| 2008/0096533 A1 | 4/2008 | Manfredi et al. | |
| 2008/0221401 A1 | 9/2008 | Derchak et al. | |

(Continued)

OTHER PUBLICATIONS

Affective Characterizations of Movie Scenes Based on Content Analysis and Physiological Changes, by Soleymani, published Jun. 2009.*

(Continued)

*Primary Examiner* — Jeffrey A Gaffin
*Assistant Examiner* — Thomas Fink

(57) ABSTRACT

Described herein are methods for training a machine learning-based predictor of affective response to stimuli. The methods involve receiving samples comprising temporal windows of token instances to which a user was exposed, and target values representing affective response annotations of the user in response to the temporal windows of token instances. This data is used for the training of the predictor along with values indicative of the number of the token instances in the temporal windows of token instances, which are used to compensate for non-linear effects resulting from saturation of the user.

20 Claims, 14 Drawing Sheets

(56) References Cited

U.S. PATENT DOCUMENTS

| | | | |
|---|---|---|---|
| 2009/0024449 A1* | 1/2009 | Pradeep et al. | 705/10 |
| 2009/0157813 A1* | 6/2009 | Jung et al. | 709/204 |
| 2010/0010317 A1 | 1/2010 | De Lemos | |
| 2010/0211439 A1 | 8/2010 | Marci et al. | |
| 2011/0106750 A1 | 5/2011 | Pradeep et al. | |
| 2011/0225043 A1* | 9/2011 | Bhatia et al. | 705/14.53 |
| 2011/0301433 A1* | 12/2011 | Sadowsky et al. | 600/300 |
| 2013/0115582 A1* | 5/2013 | el Kaliouby et al. | 434/237 |

OTHER PUBLICATIONS

Ad-me: Wireless Advertising Adapted to the User Location, Device and Emotions, by Hristova, published 2004.*
A Regression Approach to Music Emotion Recognition, by Yang, published Feb. 2008.*
Review and comparison of methods to study the contribution of variables in artificial neural network models, by Gevry published, 2003.*
Thumbs up? Sentiment Classifcation using Machine Learning Techniques, by Pang, published Jul. 2002.*
Random Forests by Breiman published 2001.*
A Bayesian Framework for Video Affective Representation by Soleymani (hereafter Soleymani II) published Sep. 2009.*
Ensemble methods for spoken emotion recognition in call-centres, by Morrison, published 2006.*
Exploiting Facial Expressions for Affective Video Summarisation by Joho, published Jul. 2009.*
Semisupervised Learning of Classifiers: Theory, Algorithms, and Their Application to Human-Computer Interaction by Cohen, published 2004.*
Calvo, R. A., & D'Mello, S., "Affect Detection: An Interdisciplinary Review of Models, Methods, and Their Applications", IEEE Transactions on affective computing, 2010, 1(1), 18-37.
Gunes, H., & Pantic, M.,"Automatic, Dimensional and Continuous Emotion Recognition", International Journal of Synthetic Emotions, 2010, 1 (1), 68-99.

Hanjalic, A., & Xu, L.-Q., "Affective video content representation and modeling", IEEE Transactions on Multimedia, 2005, 7(1), 143-154.
Nicolaou, M. A., Gunes, H., & Pantic, M., "Continuous Prediction of Spontaneous Affect from Multiple Cues and Modalities in Valence-Arousal Space", IEEE Transactions on Affective Computing, 2011, 2 (2), 92-105.
Spain, M. & Perona, P., "Measuring and Predicting Object Importance", International Journal of Computer Vision, 2011, 91 (1). pp. 59-76.
Zeng, Z., Pantic, M., Roisman, G., & Huang, T., "A survey of affect recognition methods: audio, visual, and spontaneous expressions", IEEE Transactions on Pattern Analysis and Machine Intelligence, 2009, 31 (1), 39-58.
van Broek, E. L., Janssen, J. H., Zwaag, M. D., D. M. Westerink, J. H., & Healey, J. A., "Prerequisites for Affective Signal Processing (ASP)", In Proceedings of the International Joint Conference on Biomedical Engineering Systems and Technologies, INSTICC Press, 2009, parts I.
van Broek, E. L., Janssen, J. H., Zwaag, M. D., D. M. Westerink, J. H., & Healey, J. A., "Prerequisites for Affective Signal Processing (ASP)—Part II", In Proceedings of the International Joint Conference on Biomedical Engineering Systems and Technologies, INSTICC Press, 2009, parts II.
van Broek, E. L., Janssen, J. H., Zwaag, M. D., D. M. Westerink, J. H., & Healey, J. A., "Prerequisites for Affective Signal Processing (ASP)—Part III", In Proceedings of the International Joint Conference on Biomedical Engineering Systems and Technologies, INSTICC Press, 2009, parts III.
van Broek, E. L., Janssen, J. H., Zwaag, M. D., D. M. Westerink, J. H., & Healey, J. A., "Prerequisites for Affective Signal Processing (ASP)—Part IV", In Proceedings of the International Joint Conference on Biomedical Engineering Systems and Technologies, INSTICC Press, 2009, parts IV.

* cited by examiner

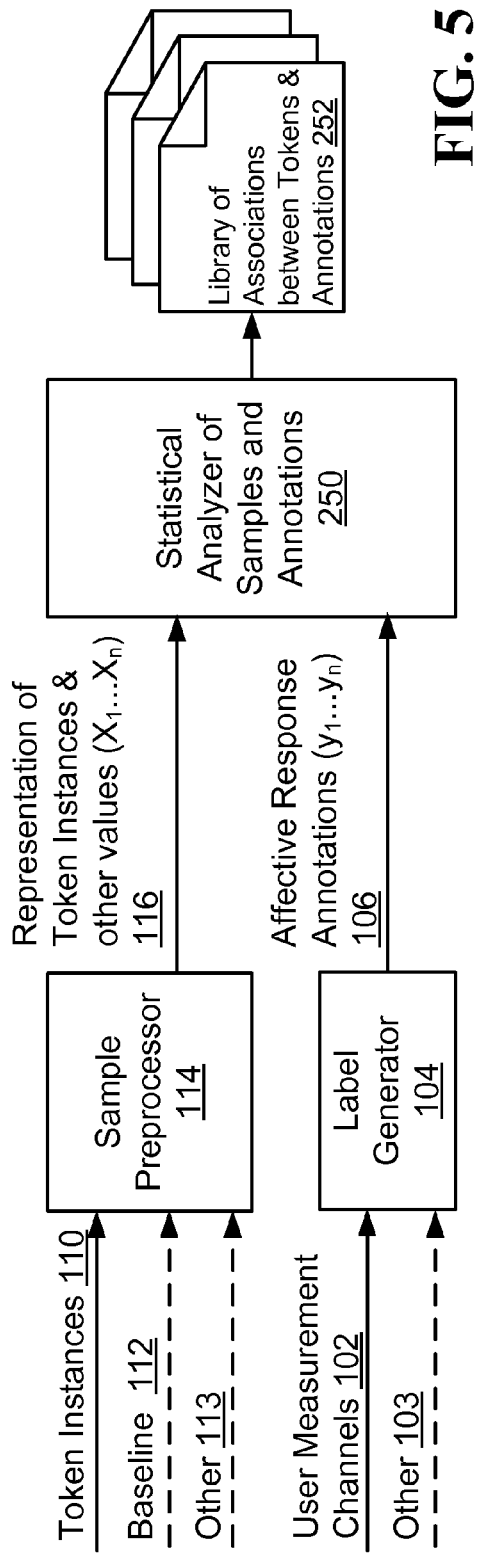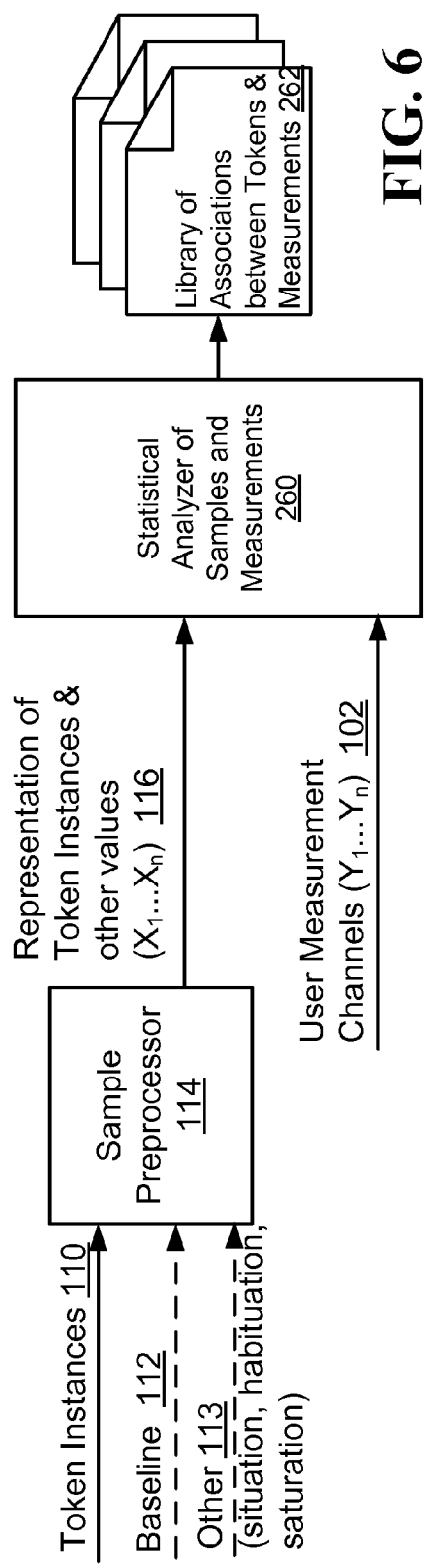

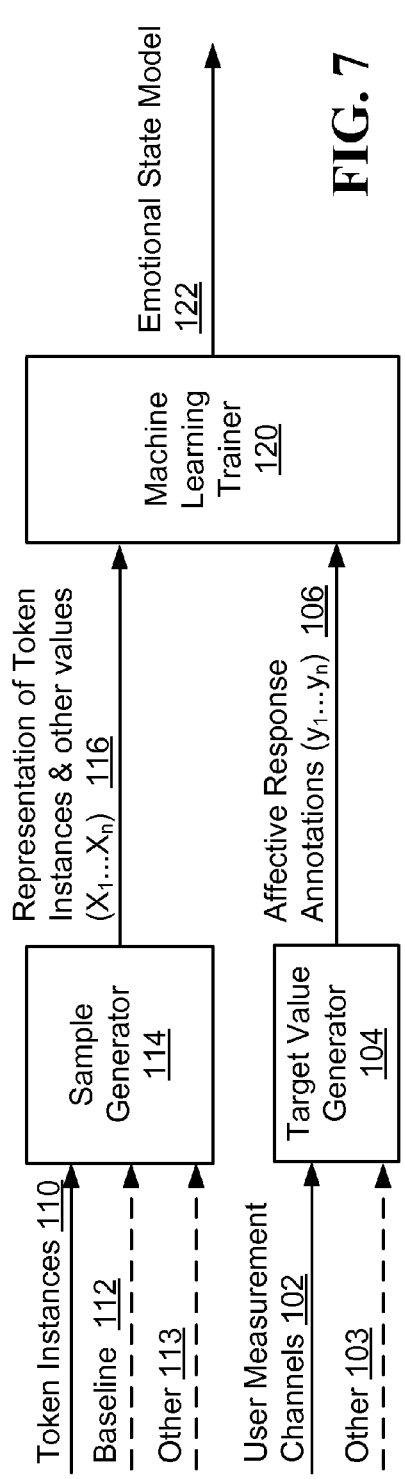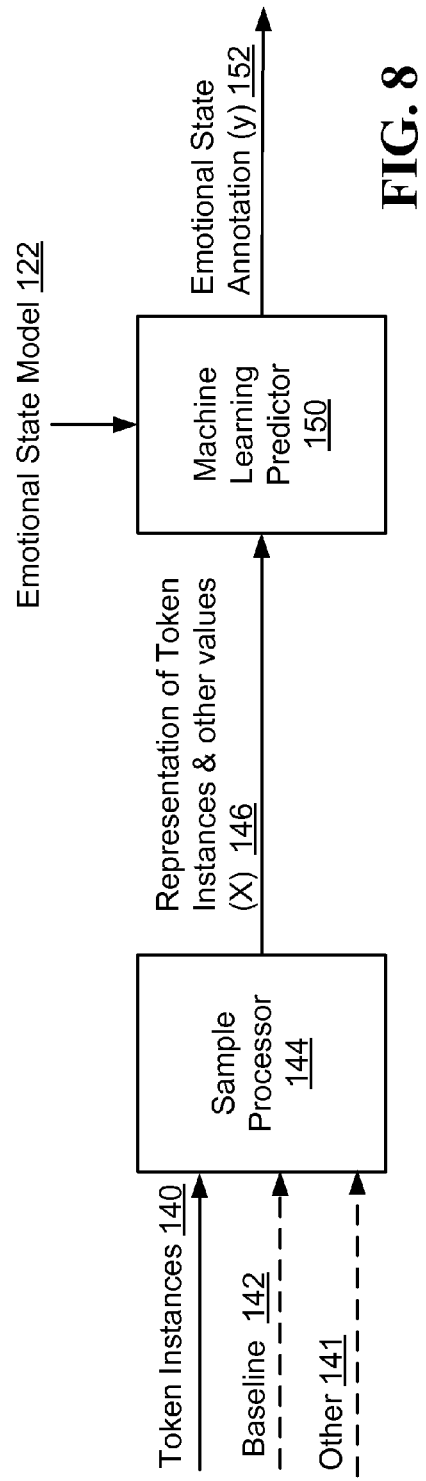

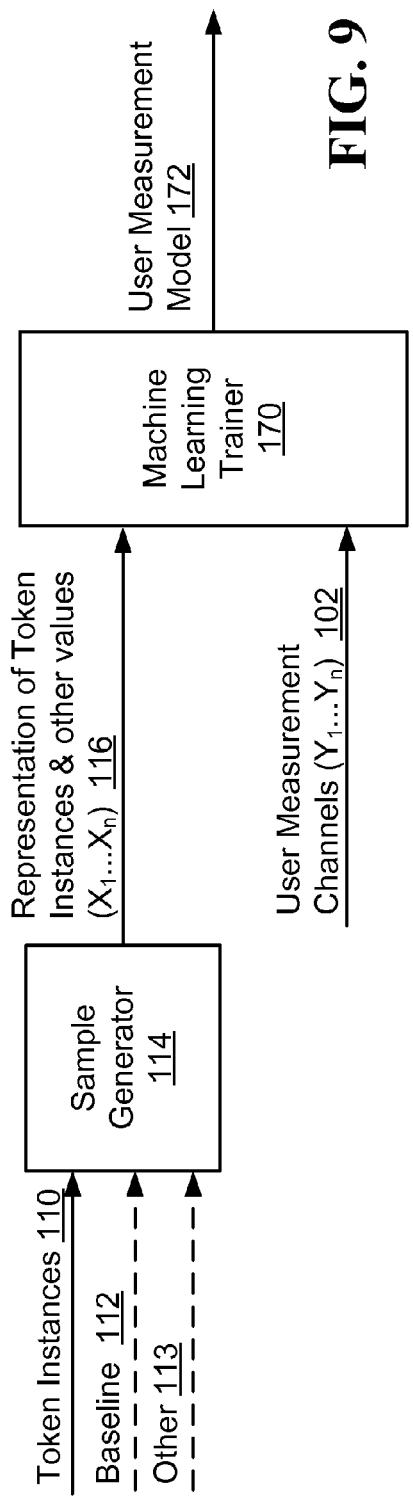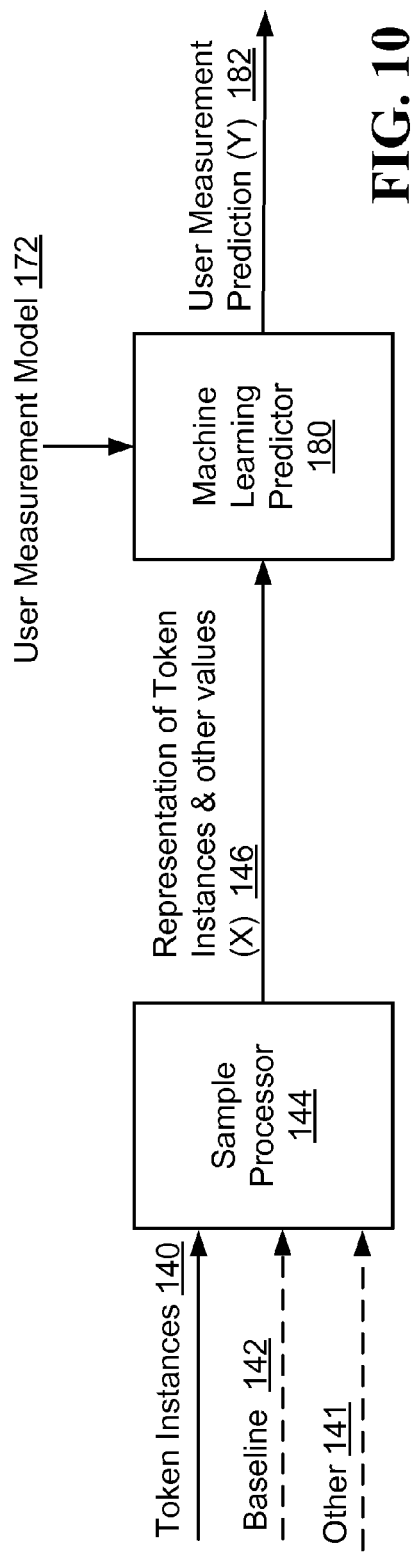

METHODS FOR TRAINING SATURATION-COMPENSATING PREDICTORS OF AFFECTIVE RESPONSE TO STIMULI

CROSS-REFERENCE TO RELATED APPLICATIONS

This application claims the benefit of U.S. Provisional Patent Application No. 61/484,673, filed May 11, 2011.

The following co-pending U.S. patent applications, filed on Jun. 6, 2011, may include related subject matter: Ser. Nos. 13/168,960, 13/168,962, 13/168,964, 13/168,967, 13/168,968, 13/168,971, 13/168,972, and 13/168,973.

BACKGROUND

The interest in the area of affective computing has grown dramatically in recent years. This interdisciplinary field, which spans computer science, cognitive science, and psychology, involves the study and development of systems that can recognize, interpret, process, and even simulate expression of human emotions. Presently, most affective computing systems are still research-grade endeavors that are typically not robust enough to handle the demands of real world applications. That being said, the continuing increase in computing power coupled with the miniaturization and proliferation of sensors and mobile devices, is making widespread adoption of affective computing systems in real world, day-to-day situations, closer than ever.

One useful capability for many affective computing applications is the ability to foretell a user's response to stimuli. Having this ability can enable the applications to offer a better user experience. While currently there are some systems that learn to predict a user's response to stimuli, they are mostly inadequate when it comes to real world applications. Existing systems are usually trained on data collected in a controlled environment. In these laboratory-like settings, a small number of short experiments are conducted (typically less than an hour long), in which users' responses are measured to a set of pre-selected stimuli, such as pictures, video scenes, or music. One drawback of the laboratory-collected data is that it is acquired over a short period of time, and the user is typically exposed to one stimulus at a time. However, in reality, a user's reaction to stimuli may vary dramatically depending on the situation the user is in, making the laboratory-collected data less useful. For example, a user's response while driving in busy traffic might be quite different from the user's response when relaxing at home, even if exposed to the very similar stimuli in both situations. Furthermore, with short experiments, a user's reaction can only be measured to a small number of stimuli, which is often inadequate for creating an affective computing system for real world applications that may have to model the effect of a wide range of stimuli from multiple sources. For example, a user may be exposed to multiple stimuli coming from digital media, such as video images and sound, while at the same time, the user may be exposed to physiological sensation stimuli originating from the massage chair the user is sitting in. The simultaneous exposure to multiple stimuli might have non-linear effects on the user, so for instance, the user's response might not add-up to the response predicted for each individual stand-alone stimulus. With the many challenges and complications involved in the real world domain, a system designed to predict a user's response to stimuli in real world scenarios may need to take into account the added complexity intrinsic to this domain in order to achieve optimal results.

BRIEF SUMMARY

Affective computing systems are becoming an imminent reality. One way in which affective computing is bound to have substantial influence on users' lives is through applications that tailor the way computerized systems interact with users in order to achieve a desired user response. For example, such systems might modify the way a robot moves or speaks so it does not annoy the user. In another example, a system may generate different media content; possibly even rendering it or modifying it on the fly, in order to increase the user's enjoyment. For a system to able to make these adjustments optimally, it is very helpful if it has the ability to predict the user's response, in real world situations, to multiple, possibly simultaneous, stimuli such as images, sounds, words, scents, flavors or physical sensations.

To this end, some embodiments of this invention disclose a machine learning-based predictor to predict a user's response after being exposed to stimuli. The machine learning-based predictor is trained on data acquired from monitoring the user over long periods, in which the user is in many different situations. During these times, the user may be exposed to many, sometimes simultaneously occurring, stimuli originating from various sources. In addition to monitoring the stimuli, the user's response to the stimuli is also monitored. This response can be expressed in different ways, for example, an affective (emotional) response or a behavioral response. By training a machine learning predictor on real world data, it is possible for the predictor to account for various phenomena such as the non-linear effects of simultaneous exposure to multiple stimuli.

BRIEF DESCRIPTION OF THE DRAWINGS

The embodiments are herein described, by way of example only, with reference to the accompanying drawings. In the drawings:

FIG. 5 illustrates a statistics based system for generating a library of association between tokens and annotations;

FIG. 6 illustrates a statistics based system for generating a library of association between tokens and user measurements;

FIG. 7 illustrates training an emotional state model;

FIG. 8 illustrates an emotional state predictor;

FIG. 9 illustrates training a user measurement model;

FIG. 10 illustrates a predictor for user measurements;

DETAILED DESCRIPTION

Figure 1:
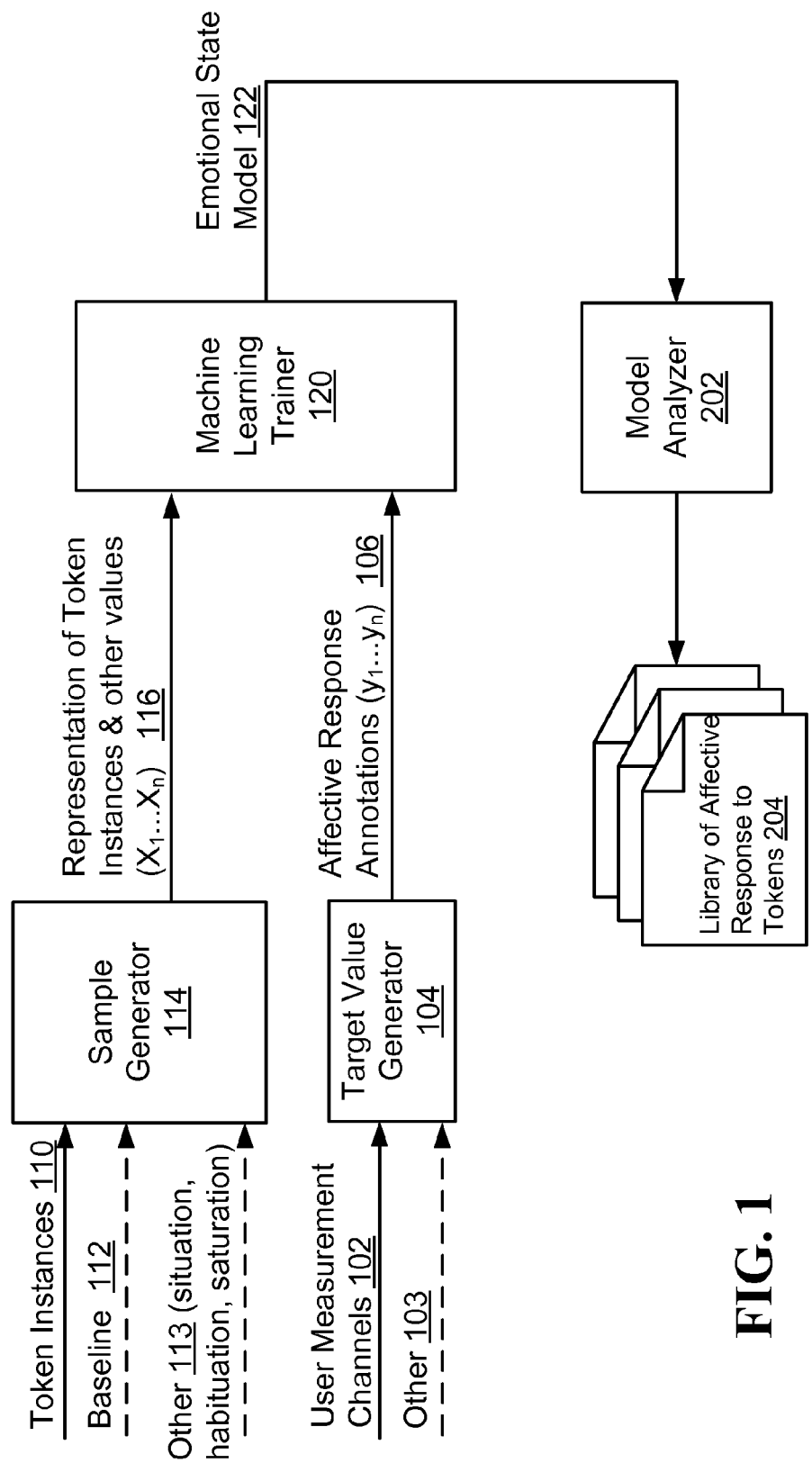
FIG. 1 illustrates an affective response library from machine learning.

Some of the disclosed embodiments comprise a system that monitors a user over long periods and in different situations to generate a model of the user's affective response. Optionally, there are two main types of inputs to the system: (i) user measurements of various types of modalities, and (ii) a stream of token instances that represent the user's cognitive state and various sensual stimuli to which the user was exposed. The system processes the user measurements to learn a model for estimating the user's affective state. By coupling the affective state estimations for various time points with information on the token instances to which the user was exposed at those times, and applying various machine learning and/or data mining techniques, the system learns an affective response model for the user. Using the machine learning models the system learnt, it may generate one or more of the following outputs: (i) user's model parameters, which describe the user's expected affective response to various tokens, and/or the dynamics of the user's affective response, (ii) a predictor of the user's affective response to a token or stream of tokens, (iii) a method for decomposing the user's affective response to determine the contribution of tokens and/or token sources to the affective response, and (iv) a method for emotional state annotation based on user measurements and tokens.

TERMS

In one embodiment, the system processes user measurement channels and/or tokens. The user measurement channels are data obtained from monitoring a user. The tokens include one or more of the following types of information: (i) data that pertains to the sensual stimuli to which the user is exposed, (ii) data that pertains to the user's cognitive condition, and/or (iii) data that pertains to the user's physiological condition. Optionally, the system may store and/or utilize data pertaining to the user's interest level in some tokens. A more detailed and comprehensive explanation about the different types of data collected and processed by the system is provided below.

The terms "affect" and "affective response" refer to the physiological and/or behavioral manifestation of an entity's emotional state. The terms "affective response/state" and "emotional response/state" may be used herein interchangeably, but usually the affective response is derived from actual measurements or observations, while the emotional state is predicted from models.

The term "user measurement channels", or the alternative form "measurement channels of the user", refer to physiological and/or behavioral measurements of the user, which may be either raw measurements and/or processed measurements (e.g., resulting from filtration, calibration, and/or feature extraction). Examples of physiological measurements include various types of signals taken of the user's physiological state using sensors for physiological properties, such as heart-rate (HR), Blood-Volume Pulse (BVP), Galvanic Skin Response (GSR), Skin Temperature (ST), respiration, electroencephalography (EEG), electrocardiography (ECG), electromyography (EMG), Electrodermal Activity (EDA), and others. Examples of behavioral monitoring include measurements derived from one or more cameras, microphones, movement sensors, acoustic sensors, and/or pressure sensors. The user measurements may utilize various existing, and/or yet to be invented, sensors and measurement devices that may be attached to the body, clothing (such as gloves, shirts, helmets), implanted in the user's body, and/or remote sensors external to the user's body. It is noted that the user measurement channels are often referred to in the literature as "modalities". In one embodiment, the user measurement channels may be received by the system as raw data, and/or after filtration (e.g., noise cancellation), and/or analyzed data (e.g., after speech recognition or image analysis).

The term "token" refers to the abstract concept of a thing that may have an influence on the user's affective state. Optionally, tokens may be categorized according to their source with respect to the user: external or internal tokens. In one embodiment, the tokens may include one or more of the following:

(i) Information referring to the concept of a sensual stimulus or a group of sensual stimuli that may be experienced or sensed by the user. These tokens usually have a specified source such as objects or systems in the user's vicinity or that the user is interacting with in some way, such as digital or printed media, augmented reality devices, robotic systems, food, and/or beverages. For example, a token may be an item (e.g. car), a movie genre (e.g., "comedy"), a type of image (e.g., "image of person"); a specific character (e.g., "Taco Bell Chihuahua"); web-site (e.g., "Facebook"); Scents or fragrances (e.g., "Chanel no. 5"); a flavor (e.g., "salty"), a physical sensation (e.g., "pressure on the back").

(ii) Properties or values derived from a stimulus or group of stimuli. For example, the rate in which scenes change in a movie; the sound energy level; the font-size in a web-page; the level of civility in which a robot conducts its interaction with a user.

(iii) Information about the environmental conditions that may influence the user's affective response. For example, a token may refer to the user's location (e.g., home vs. outdoors), the time of day, lighting, general noise level, temperature, humidity, speed (for instance, when traveling in a car).

(iv) Information about the user's physiological and/or cognitive state. For example, the user's estimated physical and/or mental health, the user's estimated mood and/or disposition, the user's level of alertness and/or intoxication.

(v) Information that if the user becomes aware of it, is expected to change the user's affective response. For example, such information may involve situations where the user's child is late to coming home, the user is in financial debt, a death in the family, depressing news, or when the user's mother in law is sitting next to him/her in the room.

The term "token instance" refers to the manifestation of a token during a defined period of time or event. The relationship between a token and its instantiation (i.e., the token instance) is somewhat similar to the relationship between a class and its object in a programming language. For example, a movie the user is watching is an instance of the token "movie" or "The Blues Brothers Movie"; an image of a soda can viewed through a virtual reality enabled device is a token instance of "soda can"; the sound of the soda can opening in the augmented reality video clip played when viewing the can may be considered a token instance of "soda can popping sound"; the scent of Chanel 5 that the user smelt in a department store while shopping for a present is an instance of the token "perfume scent", or a more specific token may be "scent of Chanel no. 5"; the temperature in the room where the user is sitting may be considered an instance of the token "room temperature"; the indication that the user sitting alone in the room is an instance of the token "being alone", and the indication that the user is suffering from the flu may be considered an instance of the token "sick".

The term "token source" refers to an element that influences the user's affective state via the user's exposure to the element's token instances. The token instances may be generated by the token source (e.g., a robot providing token instances describing its operations), by the system (e.g., the system performs semantic analysis to voice conversation), and/or received from a third party (e.g., the system accesses token instance repository for multimedia the user was exposed to). The term "distinct token sources" refers to token sources that are both distinguishable from the user's perspective and operate essentially independently. For example, a massage robot, a television, and a word processing software operating simultaneously are distinct token sources, while audio and video stimuli generated by a computer game are considered as originating from the same token source. In one embodiment, a token instance may be associated with one or more sources. Optionally, a token instance without a defined token source may be attributed to an arbitrary token source, such as the environment.

The term "exposure" in the context of a user being exposed to token instances means that the user is in a position to process and/or be influenced by the token instances, be they of any source or type.

The term "temporal window of token instances", also referred to as "temporal token instance window" and/or "window", refers to a set of token instances and other optional values, which correspond to a temporal scope defined by the window. For example, the window may contain the token instances that at least some portion of their existence occurred in the window's duration. In another example, the temporal window of token instances is a snapshot of the token instances that existed in a specific time point. Optionally, the window may have a fixed duration. Optionally, the window may have a variable length, for example spanning a certain event, such as the user's viewing of a commercial, visiting a web site, interacting with a robot, or reading an article. Optionally, the window may include values derived from other sources such as user measurement channels.

The term "situation", in the context of the user's exposure to token instances, refers to a combination of circumstances that influences the user's affective response. Monitoring the user over a long period, and in a diverse set of day-to-day situations, reveals variations in the affective response that are circumstance-dependent, which may not be revealed when monitoring the user over a short period or in a narrow set of similar situations. Examples of different situations may involve factors such as: presence of other people in the vicinity of the user (e.g., being alone may be a different situation than being with company), the user's mood (e.g., the user being depressed may be considered a different situation than the user being happy), the type of activity the user is doing at the time (e.g., watching a movie, participating in a meeting, driving a car, may all be different situations). In some examples, different situations may be characterized in one or more of the following ways: (i) the user exhibits a noticeably different affective response to some of the token instances, (ii) the user is exposed to significantly different subsets of tokens, (iii) the user has a noticeably different user emotional state baseline value, (iv) the user has a noticeably different user measurement channel baseline value, and/or (v) samples derived from temporal token instance windows are clustered, and samples falling into the same cluster are assumed to belong to the same situation, while samples that fall in different clusters are assumed to belong to different situations.

The term "machine learning algorithm" refers to a method that evolves its behavior based on empirical data.

Data Acquisition

User Measurements

In one embodiment, values from a user's user measurement channels are collected by using one or more sensors and measurement devices that may be attached to the body, clothing (e.g., gloves, shirts, helmets), implanted in the user's body, and/or remote sensors external to the user's body (e.g., camera, microphone).

In one embodiment, some of the user measurement channels are stored in a database as time series with short durations between consecutive measurement points. Optionally, the user's measurement channels are stored at different temporal resolutions, i.e., the typical difference in time between consecutive entries in the database may vary between measurement channels. Optionally, the temporal resolution of the same channel may vary at different points in database, for example, regions where low complexity in the measurement values is detected and/or regions with noisy measurements, may be stored with lower temporal resolution, i.e., longer intervals between values. Optionally, the system supports queries that provide the values of the user measurements at a required time, for example by interpolating values from the stored measurements at different times.

In one embodiment, the user measurement data may be processed and/or normalized in many ways, before, during and/or after the data is stored. In one example, the values of some of the measurements are scaled to be in the range $[-1,+1]$. In one example, the values of some of the measurements are normalized to z-values, which bring the mean of the values recorded for the modality to 0, with a variance of 1. In another example, some user measurements may be processed and/or converted to analyzable features in several ways. For example, through extracting statistics for the values of each measurement channel in a predefined window size, such as the minimum, maximum, and/or various moments of the distribution, such as the mean, variance, or skewness. In still another example, user measurements are subjected to feature extraction and/or reduction techniques, such as Fisher projections, Principal Component Analysis (PCA), and/or feature selection techniques like Sequential Forward Selection (SFS) or Sequential Backward Selection (SBS). In still another example, some of the images and video images may be processed using various detection algorithms for identifying cues like movement, smiling, laughter, concentration, body posture, and/or gaze. The images may also be processed with algorithms for detecting and describing local features such as Scale-Invariant Feature Transform (SIFT), Speeded Up Robust Features (SURF), and/or scale-space representation. In still another example, auditory and/or written data are processed using speech analysis and/or semantic analysis methods.

Some embodiments may utilize known and to be discovered methods for pre-processing user measurement data and extracting features from the measured data. For example: (i) a variety of physiological measurements may be preprocessed according to the methods and references listed in van Broek, E. L., Janssen, J. H., Zwaag, M. D., D. M. Westerink, J. H., & Healey, J. A. (2009), Prerequisites for Affective Signal Processing (ASP), In Proceedings of the International Joint Conference on Biomedical Engineering Systems and Technologies, INSTICC Press, incorporated herein by reference; (ii) a variety of acoustic and physiological signals may be pre-processed and have features extracted from them according to the methods described in the references cited in Tables 2 and 4, Gunes, H., & Pantic, M. (2010), Automatic, Dimensional and Continuous Emotion Recognition, International Journal of Synthetic Emotions, 1 (1), 68-99, incorporated herein by reference; (iii) Pre-processing of Audio and visual signals may be performed according to the methods described in the references cited in Tables 2-4 in Zeng, Z., Pantic, M., Roisman, G., & Huang, T. (2009), A survey of affect recognition methods: audio, visual, and spontaneous expressions, IEEE Transactions on Pattern Analysis and Machine Intelligence, 31 (1), 39-58, incorporated herein by reference; and (iv) pre-processing and feature extraction of various data sources such as images, physiological measurements, voice recordings, and text based-features, may be performed according to the methods described in the references cited in Tables 1, 2, 3, 5 in Calvo, R. A., & D'Mello, S. (2010). Affect Detection: An Interdisciplinary Review of Models, Methods, and Their Applications. IEEE Transactions on affective computing 1(1), 18-37, incorporated herein by reference.

Tokens

In one embodiment, the system extracts/receives/accesses a stream of token instances. The token instances may be annotated using any appropriate manual, semi-automatic, and/or automated techniques. For example, manual token labeling may be achieved using manual annotation or marking. In another example, the token labeling is partially automated using algorithms to segment media into scenes, or segment and/or outline objects in images. In still another example, the token instances are extracted from audio-visual content and labeled automatically utilizing known and to be discovered image and/or video segmentation, and/or object detection algorithms. In another example, some of the token instances may be extracted from audio-visual monitoring of the user's surroundings, for example using one or more microphones and/or one or more cameras on the user and/or in the surroundings. In another example, some of the tokens may be extracted by semantic analysis of text, uttered words, conversations, blog posts, twits, or emails; such tokens may represent specific words, phrases, or concepts that can be derived from the content of the stimuli.

In one embodiment, a single object such as an image, a word, or a sound may be the cause of multiple token instantiations. For example, a cute black puppy may instantiate the tokens "dog" and "black" (its dominant color) and "cute" (its general appearance). A song may instantiate the tokens "Rock 'n Roll" and "loud music".

In one embodiment, token instances are stored as records in a database. Optionally, the token instances are stored as a time-series, where entries in the database correspond to certain times or events and may contain information about the tokens instantiated at that time or event. Optionally, the records in the database are stored in a structure that links between the token instances and emotional state annotations of the user for times in temporal proximity to the exposure to said token instances. Optionally, the records in the database are stored in a structure that links between the token instances and user measurement channel data for times in temporal proximity to the exposure to said token instances.

In one embodiment, token instances may include values for various attributes such as a token identification number, weight, size, and/or intensity, when applicable to the type of token instance being stored. Optionally, the token instances may include the duration, and/or start time and duration, and/or start time and end time, and/or any other equivalent notation designating the period of time or events in which the user was exposed to the token instances.

In one embodiment, a token may be instantiated multiple times, optionally, at overlapping times. For example, a scene in which there are several characters appearing, may annotated as having several instances of the token "person".

In one embodiment, some tokens may be grouped into different classes, types and/or abstraction levels. Optionally, a token may belong to one or more groups of tokens. In one example dealing with media a user is viewing, the type of media the user is watching may be a high-level token group called "media type", which may include various tokens like "movie", "tv program", "web cast". On a lower level, there may be tokens describing scenes in a movie, which may grouped together under the label "scene type", which may include tokens like "romantic scene", "action sequence", "dramatic climax". In another example dealing with a user's visit to a supermarket while using a device with augmented reality capabilities (like a smartphone), a high level token group may be "locations", which may include tokens like "user's home", "supermarket", "user's office". A lower level group of tokens may be labeled "sub locations", and include various tokens like "dairy department", "soft drinks section", "checkout line". A group of low-level tokens may include specific products like "cranberry juice", "yogurt", "bread".

In one embodiment, tokens may be grouped according to various criteria such as the tokens' typical context, and/or location of experience by the user. In one example, a high-level token group may be "activity type" which will typically include activities that may last hours like "watching a movie", "rock climbing", "reading a book", "surfing the web". A low-level token group may be "images on computer screen", which will include various images seen on the computer screen with a typical short duration.

In one embodiment, token instances may be grouped according to their source or cause of instantiation. For example, all token instances instantiated by the playing of a movie (a token for the whole movie, tokens for types of scenes, tokens for images, sounds), can be grouped as having the movie as a source. In another example, all token instances corresponding to words and phrases appearing on a web-page share the web-pages URL as their source, and may be grouped together accordingly.

In one embodiment, tokens may be described using one or more hierarchies. For example, a dog may have the following hierarchical tokens: level 1—animal, level 2—dog, level 3—puppy, level 4—Labrador puppy, level 5—black Labrador puppy. A song may be given the following hierarchical tokens: level 1—music, level 2—rock n'roll, level 3—music by Kiss, level 4—"Rock n'Roll all Night" performed by Kiss.

In one embodiment, patterns or subsets of tokens may be grouped together and represented by a new pattern token. For example, if in a certain time interval, such as the one defined by a temporal token instance window, instances of the individual tokens comprising the pattern are found, they may be replaced with the corresponding pattern token. Optionally, the pattern token's weight at that time point may equal the sum of its individual tokens' weights and/or the cardinality they have for the purpose of token counts, for instance if saturation is included in the model, may equal the number of tokens in the pattern. Following this stage, the model creation, optimization, and analysis may treat the instances of pattern tokens as regular token instances.

In one embodiment, subsets of tokens that may serve as pattern tokens may be found using algorithms for finding frequent patterns. Optionally, some patterns may involve attribute values of some of the token instances. For example, some of the algorithms described in Han, J., Cheng, H., Xin, D., & Yan, X. (2007), Frequent pattern mining: current status and future directions, Data Mining and Knowledge Discovery, 15(1), 55-86, incorporated herein by reference, may be used for detecting frequent patterns in various ways.

User Interest/Attention

In one embodiment, some of the token instances may be assigned values reflecting the level of interest the user is predicted to have in said token instances. The terms "interest level" and "attention level" are used herein interchangeably. Optionally, interest level data in tokens may be compiled from one or more sources, such as (i) attention level monitoring, (ii) prediction algorithms for interest levels, and/or (iii) using external sources of information on interest levels. Optionally, interest level data in tokens may be stored as a numerical attribute for token instances. Optionally, the interest level data in tokens may express the relative interest levels in the various token instances. Optionally, interest level data in tokens may be grouped into broad categories, for example, the visual tokens may be grouped into three categories according to the attention they are given by the user: (i) full attention, (ii) partial/background attention, (iii) low/no attention.

In one embodiment, the user's level of interests in some of the tokens may be derived from the user measurement channels, which are processed to detect the level at which the user is paying attention to some of the token instances at some of the times.

In one embodiment, the general attention level may be measured, for example by a camera and software that determines if the user's eyes are open and looking in the direction of the visual stimuli, and/or by physiological measurements that may include one or more of the following: heart-rate, electromyography (frequency of muscle tension), or electroencephalography (rest/sleep brainwave patterns), which may be used to determine the level of the user's coconsciousness and/or alertness at a given moment. In one example, the fact that a user is looking or not looking at a display is used to determine the user's level of interest in a program appearing on the display.

In one embodiment, object-specific attention level may be measured for example by one or more cameras and software that performs eye-tracking and/or gaze monitoring to detect what regions of a display, or region of an object, or physical element the user is focusing his/her attention at. The eye-tracking/gaze information can be compared to object annotation of the picture/scene the user is looking at to assign weights and/or attention levels to specific token instances, which represent the objects the user is looking at.

In one embodiment, various methods and models for predicting the user's interest level are used in order to assign interest level scores for some token instances.

In one embodiment, user interest levels in image-based token instances are predicted according to automatic importance predicting algorithms, such as the one described in Spain, M. & Perona, P. (2011), Measuring and Predicting Object Importance, International Journal of Computer Vision, 91 (1). pp. 59-76. Optionally, the predicted level of interest from this type of model may be stored as an attribute value for some token instances. In one example, a model for predicting the user's interest level in various visual objects is created automatically according to the method described in Spain et al. (2011), using token instances for which there is user attention-monitoring, as training data.

Analysis of previous observations of the user's interest in some tokens may be used to determine interest in new previously unobserved tokens. In one embodiment, a machine learning algorithm is used to create a model for predicting the user's interest in tokens possibly for which there is no previous information, using the following steps: (i) extracting features for each token instance, for example describing the size, duration, color, subject of visual objects; (ii) using the attention-level monitoring data as a score for the user's interest; (iii) training a predictor on this data with a machine learning algorithm, such as neural networks or support vector machines for regression; and (iv) using the trained predictor to predict interest levels in instance of other (possibly previously unseen) tokens.

In one embodiment, analysis of previous observations of the user may be used to determine interest in specific tokens. For example, the fact that the user has watched in the past many programs about dogs, may be used to infer his/her interest in objects and/or tokens that have to do with dogs, or the fact a user has not missed any episode of a certain series in the past season, can be used to infer that he/she is interested in that certain program, and is likely to be paying attention to the content.

In one embodiment, information gathered from other users who essentially exposed to the same token instances as the user may be used to assign interest levels for the user, for example, in cases where the user's interest level data is missing or unreliable. In one example, when assigning interest level to tokens extracted from a movie, at times when the user's eye-tracking information is inconclusive for a token instance, the interest levels for that token instance can be set to average interest levels given to that token instance by other users who watched the same movie.

In one embodiment, a predictor for the level of attention a user is expected to pay to different token instances is created by combining the attention predictor models and/or prediction data from other users through a machine learning collaborative filtering approach.

In one embodiment, an external source may provide the system with data on the user's interest level in some tokens and/or token instances. In one example, information on users interest may be provided by one or more humans by answering a questionnaire indicating current areas of interest. The questionnaire may include areas such as: pets, celebrities, gadgets, media such as music and/or movies (genres, performers, etc.), and more. The questionnaire may be answered by the user, friends, relations, and/or a third party. In another example, semantic analysis of the user's communications such as voice and/or video conversations, instant messages, emails, blog posts, twits, comments in forums, keywords use in web searches, and/or browsing history may be used to infer interest in tokens describing specific subjects, programs, and or objects of interest. In yet another example, some of the user's subjects of interest may be provided by third-parties, such as social-networking sites like Facebook, and/or online retailers like Amazon.

In one embodiment, a temporal attention level is computed for the user at a specific time. Optionally, the temporal attention level is stored as a time series, for example, at each time point the system records the temporal attention level score of the user on a scale in the range [0,1], where 0 indicates that no attention being paid, and 1 indicates that full attention is being paid. Optionally, temporal attention level data may be extracted from a visual attention data source (e.g., eye-tracking, face expression analysis, posture analysis), an auditory data sources, monitoring the users movement, and/or physiological measurements (e.g., EEG).

In one embodiment, interest levels obtained from various sources are combined into a single "combined interest level score". The combined interest level score may be stored as an attribute in some of the token instances. In one example, the interest level scores from various sources such as attention-level monitoring, predicted interest based on the user's historical attention-levels, and/or interest data received from external data sources, may be available for a token instance. Each interest level sore is provided as a value in the range [0,1]. Optionally, the combined interest level score may be a weighted combination of the values from the different sources, where each source has a predefined weight.

Weighting and Normalizing Token Instance Weights

In one embodiment, token instances are given a weight attribute, which is correlated with the magnitude of the token instances' influence on the user's affective response. Optionally, a token instance may have a single or multiple values for the weight attribute. For example, multiple values may describe the token instance weight at various time points.

In one embodiment, the system supports queries that provide the values of a token instance's weight at a required time, for example by interpolating values from token instance weights at different time points.

In one embodiment, the token instance weight is a predetermined value. In one embodiment, q weight attributes are assigned to a token instance, for example, weights $w_1, \ldots, w_q$ for q different segments of the duration of the token instance's existence. The total weight assigned to the token instance equals $w=w_1+ \ldots +w_q$, and may be distributed to the q attribute values in different ways. In one example the weight is distributed uniformly, such that $w_1 = \ldots = w_q = w/q$. In another example, the weights may be distributed in a non-uniform way. For example, by assigning higher weights to earlier segments in the duration of the token instance's existence to reflect the fact that the token's influence on the affective state diminishes as time goes by. Optionally, the weight assignment to various points may follow a parametric distribution, such as an exponential or Gamma distribution, with predefined parameters, and/or parameters that are set as part of the affective response model training.

In one embodiment, attribute values for some of the token instances may be used to modify the weights of the token instances. For example, tokens that have an attribute "size" or "intensity" may be reweighted, for instance, by multiplying the token instance weight with the attribute value(s), to reflect the fact that instances that are larger or more intense have a stronger influence on the user's affective state.

In one embodiment, some of the interest level scores may be used to reweight token instances. For example, the token instance weight may be multiplied by the attention score for the token instance which is in the range [0,1], or multiplied by the average attention score.

In one embodiment, different types of tokens may be assigned different attention levels at the same time, depending on the circumstances. For example, when viewing media on a screen, if it is determined from a camera monitoring the user that he/she is momentarily not looking at the screen, all visual token instances may be given an interest level reflecting that fact, for instance a weight of 0. At the same time, it may be assumed that the user is still listening, therefore, sound-related token instances may still be given a weight greater than zero.

In one embodiment, general attention levels are allowed to affect long-lasting token instances that involve things like the genre, program, or main characters. Short lasting token instances, like object tokens such as a dog or a car, should not be influenced by the general attention levels unless the content is about the specific token instance. For example, a user is watching a movie where the scene takes place in a living room. If the user is not paying attention to the media, there is no reason to assign a weight to token instances of items in the background of the scene, such as the sofa or napping dog, since the user is not paying attention to the scene and thus anything learned about the user's affective response towards those token instances is probably noise.

In one embodiment, the weights of token instances in a database are normalized. For example, the weights may be normalized in such a way that the sum of weights from all token instances in the database at a given time, or all instances in a temporal token instance window, equal a constant. Optionally, weights of token instances may be normalized in such a way that depends on the sum of the token instance weights (denoted by S). For example, token instance weights may be normalized in such a way that they sum up to $\log(1+S)$, or the square root of S.

In one embodiment, some token instance weights are reweighted and/or normalized before the affective response model is trained. In one embodiment, some token instance weights are reweighted and/or normalized while the affective response model is trained.

Representing Emotions

In one embodiment, the user's emotional state is annotated at some time points, or for some temporal token instance windows, using various methods for representing emotions. Optionally, the annotations are obtained utilizing a transformation from a domain representing measurements to a domain representing internal emotional states. Optionally, the user's emotional state is annotated by the user. For example, the user's emotional state may be represented in one of the following methods.

In one embodiment, emotional states are represented using discrete categories. For example, the emotion categories may include three categories: negatively excited, positively excited, and neutral. In another example, the emotion categories include happiness, surprise, anger, fear, disgust, and sadness.

In one embodiment, emotional states are represented using a multidimensional representation, which characterizes the emotional state in terms of a small number of latent dimensions. In one example, the emotional states are represented as points in a two dimensional space of Arousal and Valence. Arousal describes the physical activation and valence the pleasantness or hedonic value. Each detectable experienced emotion is assumed to fall in a specified region in that 2D space. Other dimensions that are typically used to represent emotions include: potency/control (refers to the individual's sense of power or control over the eliciting event), expectation (the degree of anticipating or being taken unaware), and intensity (how far a person is away from a state of pure, cool rationality). The various dimensions used to represent emotions are often correlated. For example, the values of arousal and valence are often correlated, with very few emotional displays being recorded with high arousal and neutral valence. In one embodiment, emotional states are represented as points on a circle in a two dimensional space pleasure and arousal.

In one embodiment, emotional states are represented using a numerical value that represents the intensity of the affective state with respect to a specific emotion. For example, a numerical value stating how much the user is enthusiastic or happy. Optionally, the numeric value for the emotional state may be derived from a multidimensional space representation. For example, let P be a path or collection of points in the multidimensional space. For every point p in P, a numerical value d(p) can be computed, for instance by computing the distance that needs to be traveled along P from a reference point serving as zero to reach p. Given a point q in the multidimensional emotional space, which is not in the set of points P, the projection of q on P is a point q' in P, for which the Euclidean distance (q,q') is minimal. The numerical value for the point q may be assigned the same value as its projection on P, which equals d(q').

In one embodiment, emotional states may be modeled using componential models that are based on the appraisal theory, as described by the OCC model (Ortony, Clore & Collins, 1998). According to this theory, a person's emotions are derived by appraising the current situation (including events, agents, and objects) with respect to the person goals and preferences.

In one embodiment, emotional states represented by categories are converted to a multidimensional representation. For example, this can be done by assigning each category a representative point in the multidimensional space.

In one embodiment, emotional states described as points in a multidimensional space are converted into a categorical representation in several ways. In one example, there are predefined categories, with each category having one or more representative points in the multidimensional space. An unassigned point P in the multidimensional space may be assigned to the category that has a representative point P' for which the Euclidian distance between P and P' is smaller or equal to the distance between P and all other category representative points. In another example, the multidimensional space representing emotions is partitioned into a number of regions that cover the entire multidimensional space. Following that, the points falling in the same region belong to the same category. For example, a valid partition may be splitting the arousal-valence space into four quadrants; consequently, each point in the multidimensional space belongs to one of the four resulting categories. In yet another example, the multidimensional emotional space contains N or more points describing emotions, for example, from the emotional states of multiple people and/or multiple time points. The points in the multidimensional space are then clustered into N clusters, using an algorithm like K-means with the Euclidean distance metric. Each cluster may then represent a category, with the mean of each cluster serving as a representative point for the category. Each existing or new point P in the dimensional space may then be assigned a category by choosing the category whose representative point has a minimal distance to P.

In one embodiment, emotional states are described using a scalar value, and may be converted to a categorical representation. For example, using predefined categories, where each category has one or more representative scalar value(s). An unassigned point P in the space may be assigned to the category which has a representative point P' for which the value |P−P'| is minimal.

In one embodiment, a method is provided for computing the distance between two emotional state annotations. In one example, the distance between two categorical annotations may be computed using a pre-defined distance matrix that holds the distance between pairs of annotations. In another example, the distance between two annotations in a scalar representation may be equal the absolute value of the result of the subtraction of the value of the first annotation from the second. In yet another example, the distance between two annotations using a multidimensional emotional state representation may equal the Euclidean distance between both annotations.

Annotations

In one embodiment, machine learning algorithms are trained on data extracted from user measurement channels in order to create a model for predicting a user's emotional state at a required point in time. Optionally, data comprising token instances may also be used for training these models.

In one embodiment, models for a user's emotional state are periodically re-trained and/or updated to reflect new data that has been accumulated. Optionally, the models are re-trained following an event where the prediction error exceeds a threshold, and/or following an event where the performance deteriorates below a threshold.

In one embodiment, the data extracted from the user measurements may be normalized with respect to the user's baseline for that time. Optionally, the normalization is performed periodically, such as every few hours or every day. Optionally, the normalization is performed following a large change in one or more of the user measurement channels, such as resulting from a situation change.

In one embodiment, a baseline function for the annotated emotional state may be used as an input to a machine learning algorithm for predicting the user's emotional state.

Some embodiments may utilize known and to be discovered systems to predict the emotional state from single or multiple user measurement channels. The predictions may use various methods for emotional representation, such as categorical, dimensional, and/or appraisal-based. Examples of emotional state prediction methods that may be use include: (i) physiological-based predictors as described in Table 2 in van den Broek et al. (2009); (ii) Audio- and visual-based predictors as described in Tables 2-4 in Zeng, Z., et al. (2009); (iii) additional predictors for the emotional state that are both single-channel (unimodal) or multi-channel (multi-modal) as described in Tables 2, and 4 in (Gunes & Pantic, 2010); and/or (iv) predictors of the emotional state from low-level media features, such as described in Hanjalic, A., & Xu, L.-Q. (2005). Affective video content representation and modeling. IEEE Transactions on Multimedia, 7(1), 143-154.

In one embodiment, the machine learning system for predicting the user's emotional state may need to make decisions from multiple user measurement channels. Therefore, at some stage, the data from the different user measurement channels may need to be fused. Optionally, different types of data fusion may be employed, for example feature-level fusion, decision-level fusion or model-level fusion, as discussed in Nicolaou, M. A., Gunes, H., & Pantic, M. (2011) Continuous Prediction of Spontaneous Affect from Multiple Cues and Modalities in Valence-Arousal Space, IEEE Transactions on Affective Computing.

In one embodiment, the user's emotional state at certain time points is labeled by monitoring the user. In one example, the user is presented with sensual stimuli that are known to predict certain emotions, such as images, videos, and/or sounds that are known to elicit an emotional response. In another example, the user is presented with media clips which he views and after each one reports the elicited emotions (e.g., positive, negative, or neutral), or is asked to provide values in a dimensional space, for example in the Arousal/Valence dimensions. Optionally, users may use systems that aid emotional state annotation, for example, a system that describes various emotional states using cartoon images. In yet another example, the user may have the option to create training samples, for instance, by indicating that what he/she just saw gave a good or bad feeling. Alternatively, the user may be asked to imagine scenarios in which certain emotions are felt, and the user measurements at that time may be used as training sample.

In one embodiment, a pre-trained model for predicting the emotional state from user channel measurements is used to label the user's emotional state at certain time points. Optionally, the system is trained on data from multiple users.

In one embodiment, a pool of models for predicting the emotional state from user channel measurements may be available to label the user's emotional state. Optionally, each model was trained using a single individual. In order to accurately label the user's emotional state, a model belonging to a person similar to the user is selected for the labeling process. The similarity between people may be determined in several ways, for example, by observing similar patterns in the values of their user measurement channels and/or token instances to which they were exposed, by observing similar demographic and/or educational characteristics, and/or by semantic analysis of speech, text, and/or video content created by the people determine similar attitudes and/or world views.

In one embodiment, one or more methods are used to label an initial set of training points with the user's emotional state. These labeled points, in turn, are used to train the user's model for predicting the emotional state. Following that, several rounds of bootstrapping may ensue, in which the user's model is used to label additional points, which are then used to retrain the user's model. With each iteration, the user's model may better fit the training data. Optionally, the model's performance is tested on an independent test set, which was labeled using a different model (for example trained on another portion of the data set), in order to prevent overfitting. Optionally, other semi-supervised training methods may be used to create the model for predicting a user's emotional state.

Situations

In one embodiment, a user's exposure to tokens and/or the user's response are monitored over a long period of time that spans various situations. Different situations may affect the user's behavioral and response. For example, the user's reaction to certain token instances may change depending on the situation in which the user was in while being exposed to the token instances. For example, a user may react calmly to adult-themed material when viewing alone (one situation), however the same user may react angrily if such material was to appear while the user's children were present (a different situation). In another example, the user's baseline value for an emotional state and/or user measurement channel may change significantly in different situations, such as when the user is driving vs. relaxing at home, or when the user is alert vs. inebriated.

In one embodiment, information describing a user's situation during certain times and/or events is stored in a database. Optionally, some situations are described using one or more token instances and/or attribute values of one or more token instances. Optionally, information describing a situation is linked to some of the token instances. Optionally, information describing a situation may be linked to database records corresponding to temporal token instance windows. Optionally, the information describing some situations may be in the form of situation identifiers.

In some embodiment, situation identifiers are received describing the user's situation during certain times and/or events. Optionally, a classifier may be trained to identify the situation occurring during new times and/or events. Optionally, the training samples used to train such a classifier comprised of one or more of the following elements corresponding to a certain time and/or event: values of some token instances and/or their attributes, values from one or more user measurement channels, an emotional state annotation, a baseline value for the emotional state, and/or baseline values for one or more user measurement channels. Optionally, some training samples are assigned labels corresponding to their respective situation identifiers. Optionally, a machine learning classification algorithm is trained using the training samples, in order to produce a classifier that may identify the situation in which the user is at various times and/or events. For example, the machine learning algorithm used to train a classifier may be a neural network classifier, a support vector machine, maximum entropy classifier, or a random forest. In one embodiment, the training data may be comprised of labeled and unlabeled data (for which the situation is unknown), and a semi-supervised machine learning method may be employed to train the classifier.

In one embodiment, the data may initially not include a description of situations, so situations may need to be discovered from the data in an unsupervised, or semi-supervised fashion. The following examples describe different situation characterizations to be discovered automatically:

(i) Certain situations may be characterized by a small set of specific token instances. For instance, the situation in which the user is driving may be characterized by a token instance "user is driving", while the situation that the user is not alone may be characterized by a token instance "other people are in the user's vicinity".

(ii) Different situations may be characterized by the fact that the user is exposed to a different characteristic set of similar token instances, and/or tokens originating from similar sources. For example, in a situation labeled "watching TV" a user may be exposed to visual tokens belonging to images, while in a situation labeled "reading", the user may be exposed to many tokens corresponding to words.

(iii) Some situations may be characterized by the fact that the user exhibits a noticeably different response to instances of certain tokens. For example, in a situation that may be labeled "hungry" the user may experience a certain affective response such as high arousal when exposed to tokens related to food. However, in a situation labeled "not hungry", the user may exhibit a much milder affective response to token instances related to food.

(iv) Some situations may be characterized by the fact that the user has typical baseline levels for the affective state and/or one or more of the user measurement channels. For example, when in the situation "driving" a user may have a typical affective state baseline that is at a high level of arousal for the whole duration or most of time in which the user this situation, while when the user is in the situation "relaxing at home", the baseline arousal level is much lower.

(v) Situations may be characterized by the fact that samples representing certain times or events in which the user was in the same situation, tend to belong to the same clusters when an unsupervised clustering algorithm is run on the samples. For example, the samples may be comprised of vector representations of temporal token instance windows. When a clustering algorithm like K-means is applied to the data, each cluster of vectors of windows may be considered a different situation.

In one embodiment, a method for detecting different situations utilizes a mixture model and an Expectation Maximization (EM) algorithm. Optionally, the method comprises the following steps:

(i) Acquiring or receiving samples—data collected for certain times or events is received, for example in the form of vector representations of temporal token instance windows. Optionally, variables in the vectors participating in the EM likelihood computation may be assumed to come from a distribution with a parametric form, for example, a variable with k possible values may be considered to have a discrete distribution with k parameters $p_1, \ldots, p_k$, such that $p_i \geq 0$, for $i=1 \ldots k$, and $p_1 + \ldots + p_k = 1$, which correspond to the variable's k possible values. In another example, a real-valued variable may be assumed to have a parametric distribution, such as a Gaussian with parameters $\mu, \sigma^2$.

(ii) Initializing—The method receives a desired number of situations N. Initially some of the samples are assigned to the N situations. Optionally, some situation assignments are received as an input. Optionally, the samples are randomly assigned situations to N situations. Optionally, an initial partitioning of samples is done using one or more of the aforementioned characterizations of different situations. For example, all samples with a certain token instance (e.g., "driving") may be assigned the same situation. In another example, all samples for which there is a similar user measurement channel value (such as low heart-rate), are assigned the same situation. Optionally, the assignment process to situations may be hierarchical, and use more than one round of partitioning. For example, all sample grouped together because of a low heart-rate may be further refined by clustering them into several clusters. The partitioning into situations may continue until the total number of groups of samples (corresponding to situations) reaches N. Optionally, certain samples may belong to more than one situation (i.e., their weight may be spread over several situations).

(iii) Training a model using and EM approach—looping until the model converges, performing the following steps:

Expectation—Using the current set of parameter values, compute for each sample the probability that it belongs to each of the situations. Optionally, in the first iteration, the initial assignments to situation groups may be used instead.

Maximization—Re-estimate the parameters using maximum a posteriori parameter estimation to find a set of parameter values that maximizes the expected log likelihood of the data.

(iv) Returning results—returning the model's parameters after convergence and/or situation assignments for samples in the form of probabilities of a sample being in the N different situations or returning only the most likely situation for each sample.

In one embodiment, samples with situation assignments obtained with the EM procedure may be used to train a classifier for predicting the situation for new unseen samples. Optionally, a machine learning method such as a neural network, support vector machine, random forest, decision tree, or other machine learning classification algorithms, may be used for this task.

In one embodiment, a method for identifying different situations utilizes a clustering algorithm. Data collected for certain times or events is received and converted to samples that may be processed by the clustering algorithm, for example in the form of vector representations of temporal token instance windows. Optionally, the clustering algorithm uses a distance function for samples that utilizes a function for computing the distance between two temporal token instance windows. Optionally, the clustering algorithm utilizes a distance function that computes the distance between samples' emotional state annotations. Optionally, the distance function between samples combines the two measures, for example using a weighted sum, where a predefined weight $\alpha > 0$ is given to distance between temporal token instance windows of the two samples, and a weight $1-\alpha$ for the distance between the emotional state annotations of the two samples.

In one embodiment, a hierarchical bottom-up clustering algorithm is used to identify situations. Given a pre-defined number of desired situations, the algorithm is run iteratively, starting off with each sample as a singleton cluster, and in each iteration joining the most similar clusters. Optionally, the algorithm proceeds to run until a threshold is reached such as a maximal distance between joined clusters. Optionally, the algorithm proceeds until the number of clusters reaches a predefined target.

In another embodiment, partitioning clustering algorithm such as K-means is used to identify situations. Optionally, the algorithm is run using a pre-specified number of desired clusters. Optionally, the clustering algorithm is run several times with a different number of desired clusters, choosing the configuration giving a desired tradeoff between the number of clusters and the tightness of clusters (expressed for example, as mean squared distance to the cluster centers).

In one embodiment, after running the clustering algorithm, each sample is assigned a situation identifier corresponding to its cluster. The samples with situation assignments may be used to train a classifier for predicting the situation for new unseen samples. Optionally, a machine learning method such as a neural network, support vector machine, random forest, decision tree, or other machine learning classification algorithms, may be used for this task.

Baselines

In one embodiment, one or more baseline levels (also referred to in this disclosure as "baseline values") are computed for the user's response indicators, which may be the user's affective state and/or values of some of the user measurement channels. A user's baseline level for a response indicator is a representative value of the user's usual state, computed from multiple values of the response indicator acquired over a long period, such as a few hours, a day, a month, or even a year. A baseline level usually reflects the expected value for the response indicator when not considering the effects of the user's short term-exposure to token instances.

In one embodiment, a user's baseline level is computed for a categorical response indicator, such as the user's emotional state, which is represented by emotional categories. Optionally, the baseline level is computed by observing the values of the categorical response indicator over a long period, and using for a baseline level the category that was the response indicator's value the longest time. Optionally, the baseline level comprises a set of values that describe the proportion of time the response indicator had each of the categorical values.

In one embodiment, a user's baseline level is computed for a real-valued response indicator, such as a user measurement channel or a dimension in an emotional state representation. Optionally, the baseline level is computed from observations of the response indicator's values collected over a long period. Optionally, a baseline level may be multidimensional, being comprised of several baselines corresponding to individual dimensions. For example, a user's baseline may be comprised of a baseline level for the user's arousal and a baseline level for the user's valence.

In one embodiment, a user's baseline level for a response indicator is computed using a window of a fixed duration (such as an hour, a day, a week), from which the values of the response indicator are collected for the baseline computation. Optionally, the baseline level is computed when the user is in a specific situation (such as being alone, watching tv, being in a happy mood) by collecting values of the response indicator during periods when the user was in essentially the same situations.

In one embodiment, a user's baseline level for a response indicator is computed by collecting multiple values of the response indicator, optionally over similar situations, and applying various computational procedures to the collected values, such as: (i) averaging values in a sliding time window of a predefined size; (ii) a weighted average of the collected values; (iii) low-pass filtering to the values; (iv) Fourier transform to the collected values; and/or (v) wavelet transform analysis to the data.

In one embodiment, a baseline value may be comprised of a weighted combination of several baseline values computed from data collected at different time-scales and/or situations. For example, a baseline for the emotional state of a user watching an action movie on a television set may be comprised of the following baselines: 20% of the weight is given to the user's baseline computed from data collected during the previous 24 hour period (in all situations), 30% of the weight is given to the baseline computed from data collected from the user's most recent two hours of television viewing (of any program type), and the remaining 50% of the baseline weight is given to the baseline computed from the last 100 hours of the users viewing of action content (such as movies or television programs).

In one embodiment, the user's baseline level values for a response indicator computed at different times and/or situations are stored in a database. Optionally, additional values are stored in the database such as (i): values and/or baseline values for user measurement channels; (ii) values and/or baseline values for the user's emotional state; (iii) situation identifiers denoting situations the user was in during the period in which data was collected for the baseline computation; (iv) values and/or baseline values of tokens describing the user's situation; and/or (v) linkage information between baseline values at certain times and records corresponding to temporal token instance windows.

In practice, the ideal baseline function is often not a simple smooth average function, because the baseline level may dramatically depend on the user's situation. As a result, the user's baseline level may change significantly during a short duration of time when there is a significant change in the user's situation. Thus in practice, the baseline does not resemble a smooth slow-changing function typically observed when the baseline is computed as an average of values collected over long periods of time. For example, when the user is alone at home watching TV, he/she has one baseline level for the emotional state; if the user's mother-in-law enters the house, the user's emotional state baseline may change significantly in a very short time, and remain in that changed state for the duration of the mother-in-law's presence. This rapid change in baseline may not be reflected in a timely manner if the baseline is computed simply by averaging values in a large temporal window, while disregarding the context of different situations.

In one embodiment, a user's baseline level is predicted using a machine learning method, such as a support vector machine, a regression method, a neural network, or support vector machine for regression. The training data for the machine learning method may include samples comprising response indicator values and various input variable values. Optionally, the data for the samples is collected while the user is in specific situations, in order to train situation-specific baseline predictors for the user.

In one embodiment, the training data for a machine learning-based baseline value predictor for a user comprises data of the following types:

(i) Computed baseline values for the user for the response indicator and/or other variables (such as user measurement channels). Optionally, the baseline values are computed using data collected in different ways, such as by collecting values from time intervals of different durations and/or times in which the user was in certain situations. Optionally, the baseline values for the time windows computed for the data from the time intervals using various methods such as averaging, low-pass filtering, Fourier Transform, and/or wavelet transform.

(ii) Situation identifiers and/or values of some token instances, or their attributes, at specific times (such as the time for which the baseline is predicted), which may be used to define the user's situation. Note that the token instance values provided to the machine learning method typically include long-lasting token instances that describe properties like the user's activity (e.g., watching a movie, driving, being massaged), or properties describing the user's environment (e.g., at home, sitting alone), or the user's state or mood (e.g., excited, tired). Such long-lasting token instances may have long-lasting influence on the user's baseline values.

(iii) Baseline values computed or collected from other data sources, such as models of other users.

In one embodiment, after using a machine learning training method to process the training data, the resulting model is used to predict the user's baseline level for a response indicator. When information regarding the user's situation and/or situation-specific inputs are provided (such as baselines for specific situations), the resulting predictions for baseline values made by the classifier may rapidly adjust to situation changes that may lead to dramatic changes in the user's baseline level for some of the variables.

In one embodiment, a method for calculating a situation-dependent rapidly-adjusting baseline value predictor for a user, utilizes a database, in which there are annotations describing the user's response, and corresponding situation identifiers, for at least some of the annotations. Optionally, some of the annotations stored in the database correspond to emotional states. Optionally, some of the annotations stored in the database correspond to values from the user's measurement channels.

In one embodiment, a database is provided with a situation identifier, and optionally, a time scope from which to extract annotations. The database retrieves annotations corresponding to the provided situation identifier, optionally, occurring within the provided time scope. In some examples, the retrieved annotations span along time, in which the user may have been in various situations. Thus, the retrieved annotations may correspond to intermittent time intervals, separated by intervals of time in which the user was in situations other than the one designated by the provided situation identifier.

In one embodiment, a baseline value for the response indicator is computed from the retrieved annotations, for example, by averaging the values, or performing low-pass filtering on the values. Since the values retrieved from the database correspond to a specific situation, the computed baseline also corresponds to the situation. Thus, even if the user changes situations in a very short time, the computed baseline is adjusted rapidly to reflect the new situation. These situation-dependent changes in the baseline level occur despite the fact that the baseline may be computed by a weighted average data spanning a long duration. This is opposed to a sliding window approach in which, typically, if the window has a length of T (for example T=1 hour), the computed average changes slowly, taking time to reflect situation-dependent changes in the baseline. Thus, even after a situation changes, it typically takes a sliding window a long time, such as T/2, to significantly reflect the change in the baseline.

In one embodiment, a method for calculating rapidly-adjusting baseline value for a user, utilizes a database which comprises data such as annotations describing the user's affective response, information regarding the token instances the user was exposed to and/or values from the user's measurement channels. Optionally, the data in the database is accessible as a collection of temporal token instance windows and their corresponding annotations. In addition, a distance function for computing the distance between database records is also utilized, for example, a function that computes the distance between vector representations of temporal token instance windows. The computation of the baseline comprises the following steps:

(i) The system is given a database an input record describing the time for which the baseline needs to be computed;

(ii) Optionally, the system is given a time interval from which database records may be samples. Optionally, if one is not provided, the system may use a fixed time interval such as the last 48 hours;

(iii) The system scans the database in the time interval, retrieving all records whose distance from the input record is below a pre-defined threshold; And (iv) The values from which the baseline is to be computed are extracted from the retrieved records, and a baseline value is computed for example, by averaging the values, low-pass filtering or applying Fourier transform analysis.

Windows

In one embodiment, individual temporal token instance windows may be assigned weights. For example, a certain window may be given a higher weight than others if it is deemed more important, for instance, if it appears before a time where there is significant change in the user's predicted emotional state and/or user measurement values. In another example, certain windows may cover times in which the measurements are known to be more accurate, so the window weights may be increased in order to increase these windows' influence during model training.

In one embodiment, the token instances in a window are represented by a vector. For example, where the number of possible different tokens is N, a window is represented by a vector of length N, where position i in the vector holds the sum of the weights of all instances of token i in the window, or zero if there were no instances of token i in the window. Optionally, position i in the vector may hold the number of instances of token i that existed in the window.

In one embodiment, the vectors representing windows are preprocessed and/or modified using some of following embodiments.

In one embodiment, the set of token instances in a window may be filtered to exclude some of the token instances. For example, only the top K token instances with the highest weights are represented in a window.

In one embodiment, the weight values in a window's vector are normalized. Optionally, the weights are normalized so the sum of the weight attributes in the window's vector equals a pre-defined constant, for example 1. Alternatively, the weights in the vector, which before normalization sum up to W, are normalized to sum up to a function of W, such as $\log(1+W)$, or the square root of W. Optionally, the token instance weights are normalized according to the duration of the window. For example, by dividing a token's instance weight by the duration of the window, or by a function of the duration of the window.

In one embodiment, additional values may be added to a window's vector that are derived from various sources, such as the attribute values for the token instances in the window, attribute values from other windows, or various baseline values.

In one embodiment, the window vectors include variables derived from the token instances' attribute values. For each attribute, variables may be added in one or more of the following ways: (i) A single variable representing all instances in the window. For example, the attribute describing the general interest level, as measured by an eye-tracking device, may be added as a single variable. In another example, a single variable "intensity" may be added to the vector and given the average value of the intensity attribute for all token instances that have that attribute. (ii) Multiple variables representing different groups of token instances. For example, separate variables for the attribute sound energy may be created for different types of token instances, such as "short sounds", tokens whose source is "music videos", and those whose source is "classical music". (iii) Multiple variables for each token instance. Optionally, each token instance may have variables such as weight, interest level, and size.

In one embodiment, the vectors describing temporal token instance windows include variables describing a baseline value corresponding to the window's scope, are added to the vector.

In one embodiment, the vectors describing temporal token instance windows include variables describing the difference between the user's state at a certain time (e.g., user emotional state, or a value from a user measurement channel) and the user's baseline value for the corresponding time (e.g., the predicted baseline value for the user's emotional state or user measurement channel value).

In one embodiment, the vectors describing temporal token instance windows include a variable describing the temporal token instance window's duration.

In one embodiment, the vectors describing temporal token instance windows include variables describing the number of token instances in the window and/or their weight. Adding such a variable may assist to incorporate the affects of saturation into models. Often when saturation occurs, the effect of an additional stimulus is diminished when a large number of stimuli are experienced simultaneously. Optionally, separate variables may be added for different groups of tokens, such as image tokens, word tokens, or music tokens.

In one embodiment, the vectors describing temporal token instance windows include variables describing the number of times a token had been instantiated previously in various windows. For example, a variable describing how many times in the past minute/hour/day a token had been instantiated is added for some tokens or groups of tokens in order to assist models account for affects of habituation, where repeated exposure to the same stimuli may diminish their effect on the user.

In one embodiment, variables in the vectors describing temporal token instance windows may be split into b variables representing b bins for the value of the variable, each representing a different range of values.

In one embodiment, a variable may be split into several conditional variables, all corresponding to the same original variable; however, only one of the derivative variables is given a value in each window. The choice of which of the variables is given a value may depend on a value from another source such as token instance or baseline value. For example, a variable corresponding to the token "movie" may be split to two separate variables according to a token named "viewer is watching alone", so if the user is watching the movie alone, a non-zero value is given to one variable corresponding to "movie". And if the user is not alone, a non-zero value is given to the other variable. In another example, variables are split according to the value of a baseline for the user. For example, splitting a variable according to the quadrant in a 2D arousal/valence space in which the baseline value falls. Such splits may assist certain models account for the fact that certain token instances may have a dramatically different effect on the user, depending on the user's baseline emotional state (such as the person being in a good or bad mood).

In one embodiment, a new variable in the vectors describing temporal token instance windows may be assigned values that are the result of a function applied to one of the values of one or more variables in the vector. For example, a variable may equal the square of the weight assigned to a token instance. In another example, a variable may equal the weight of a token instance multiplied by the interest level of that token instance. Optionally, the new variable may replace one or more of the variables used to assign its value.

In one embodiment, a distance function is provided for computing the distance between two vectors representing temporal token instance windows. In one example, the distance function computes the dot-product of the two vectors. In another example, the distance function computes the distance between the two vectors using a metric such as the Euclidean distance or Hamming distance. In yet another example, where $X_1$ is the set of token instances in the first window and $X_2$ is the set of token instances in the second window, the distance between the windows equals $1-(|X_1 \cap X_2|/|X_1 \cup X_2|)$.

In one embodiment, a "target value" describes a state or a measurement corresponding to a temporal window of token instances. For example, a target value may be an emotional state prediction of the user, or a value derived from the user measurement channels. Optionally, the target value may be represented by discrete categories, a univariate value, or a point in a multidimensional space. In one example, the target value represents a transition between two categorical states. In another example, the target value represents the difference between the user's states at the end and beginning of the window. In still another example, the target value represents an average value of a variable over the scope of the window.

Databases

In one embodiment, a database stores a list of the token instances representing stimuli that may influence a user's affective state. Optionally, each token instance in the list is stored as a token identifier linked to a record comprising additional attributes such as beginning time of the token's instantiation and/or the user's exposure to the token instance, duration of exposure and/or instantiation, the weight of the token instance, the user's interest/attention level in the token instance. Optionally, the database also includes affective response annotations, for example, an emotional state represented as a category, a scalar, or multidimensional value. Some of the stored token instances may be linked to the annotations, for instance by storing the annotation as an attribute of the token instances. Optionally, the database also includes situation identifiers, describing the user's situation when being exposed to some token instances. For example, by adding the situation identifiers as attributes of the token instances. Optionally, the database is used to supply data for training a machine learning-based affective response model for the user.

In another embodiment, a database stores a collection of temporal windows of token instances. Optionally, each window has a fixed duration, for example, ten seconds. Optionally, the token instances and some of their optional attributes (such as weight, interest/attention level, size) are represented by a vector of values. Optionally, windows may be assigned annotations representing affective responses, such as an emotional state and/or change in state represented as a category, single dimensional value, and/or multidimensional values. Optionally, windows may be assigned one or more situation identifiers, denoting the user's situation when being exposed to the tokens in the window. Optionally, the database is used to supply data for training a machine learning-based affective response model for the user.

In one embodiment, the token instances stored in a database are obtained from long-term monitoring of the user, for example, for a period lasting from days to years. Optionally, the token instances stored in the database originate from multiple token sources, and the user may be exposed to them in many different situations. Optionally, the user is exposed to more than one token instance simultaneously, i.e., the user is exposed to multiple tokens with overlapping instantiation periods. Optionally, some of the stored tokens instances comprise representations of elements extracted from digital media content, such as images, sounds, and/or text. Optionally, some of the stored tokens instances comprise representations of elements extracted from an electromechanical device in physical contact with the user.

In one embodiment, database storing information about token instances, also stores information from at least one user measurement channel. Optionally, the database includes linking information such as time stamps to associate between token instances and the user measurement channels measured in temporal vicinity of the exposure to some of the token instances. Optionally, the user measurement channels may be stored at different time resolutions, for example, values of EEG signals may stored every 50 milliseconds, while skin temperature may be stored every two seconds.

Figure 11:
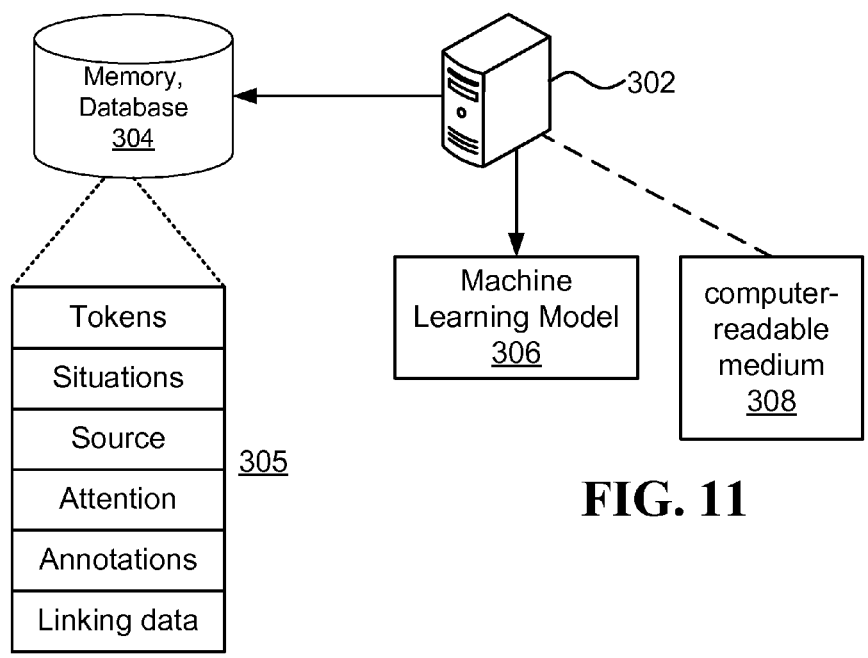
FIG. 11 illustrates a token database.

FIG. 11 illustrates a memory 304 for storing data for access by an application program 302 being executed on a data processing system. A data structure 305 stored in the memory 304 includes information resident in a database 304 used by the application program 302. The application program 302 trains a machine learning based affective response model 306 for a user, using the data structure stored in the memory. The data structure 305 stored in the memory including: token instances representing stimuli that influence a user's affective state, stored in the memory. The stored token instances are spread over a long period of time that spans different situations, and a plurality of the stored token instances have overlapping instantiation periods. Data representing levels of user attention in some of the token instances used by the application program to improve the accuracy of the machine learning based affective response model for the user. Annotations representing emotional states of the user, stored in the memory. The stored annotations are spread over a long period of time that spans different situations. And linkage information between the token instances, the data representing levels of user attention, and the annotations. Further illustrated an optional computer-readable medium 308 includes instructions, which when executed by a computer system causes the computer system to perform operations for training the machine learning based affective response model 306 for a user.

Figure 12:
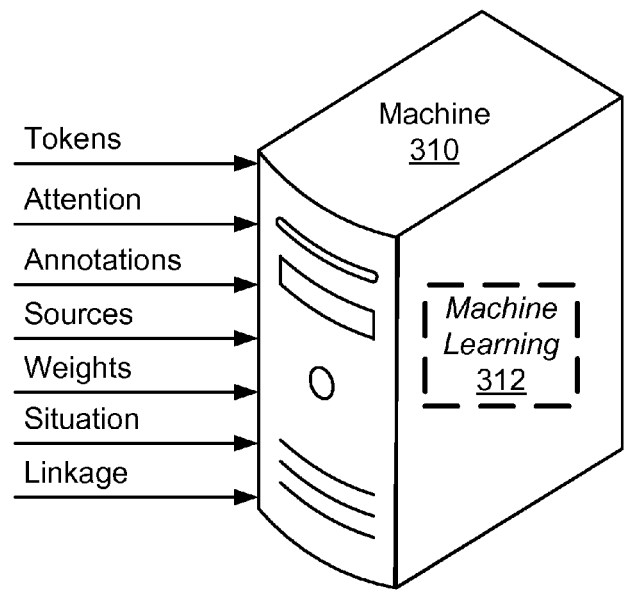
FIG. 12 illustrates a machine having a memory containing data used to train a machine learning based affective response model for a user.
Figure 13:
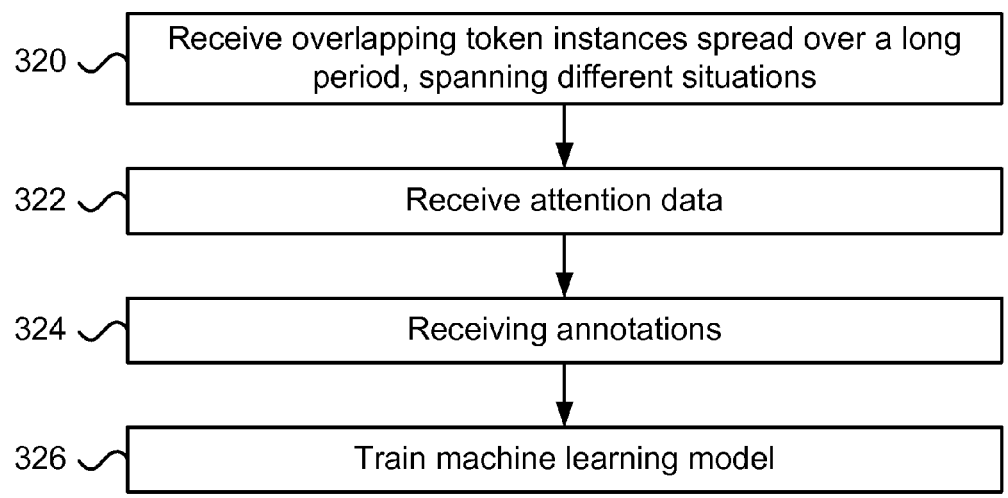
FIG. 13 illustrates a method in accordance with one embodiment.
Figure 14A:
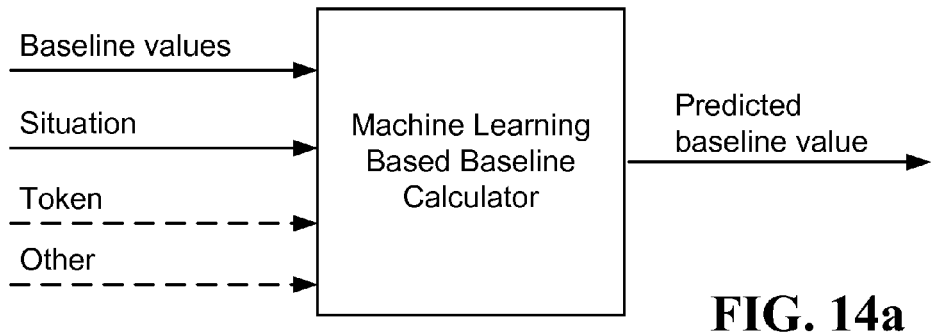
FIG. 14a illustrates a machine learning based baseline calculator.
Figure 14B:
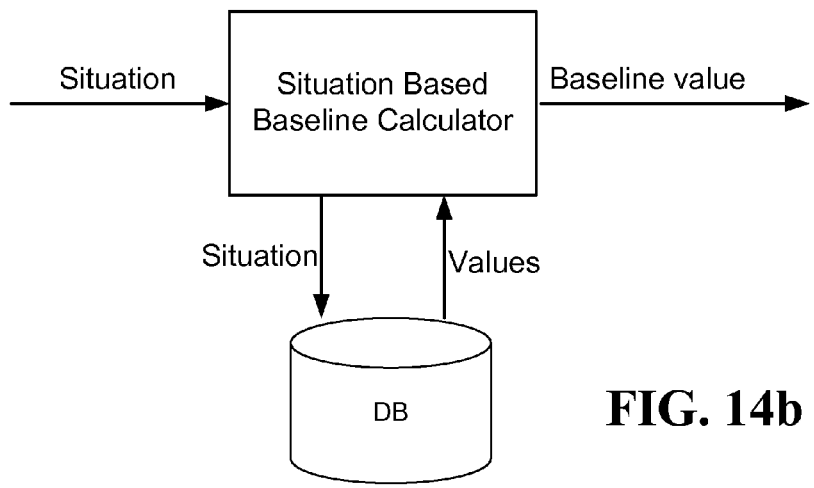
FIG. 14b illustrates a situation based baseline calculator
Figure 14C:
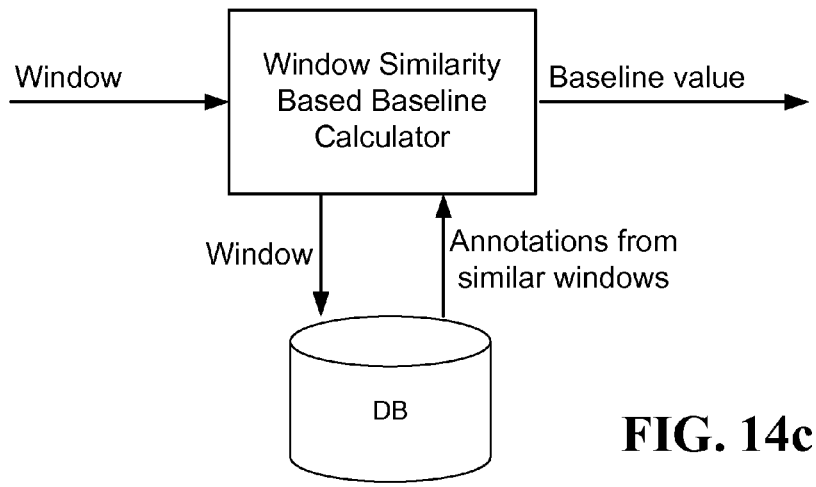
FIG. 14c illustrates a window similarity based baseline calculator
Figure 15:
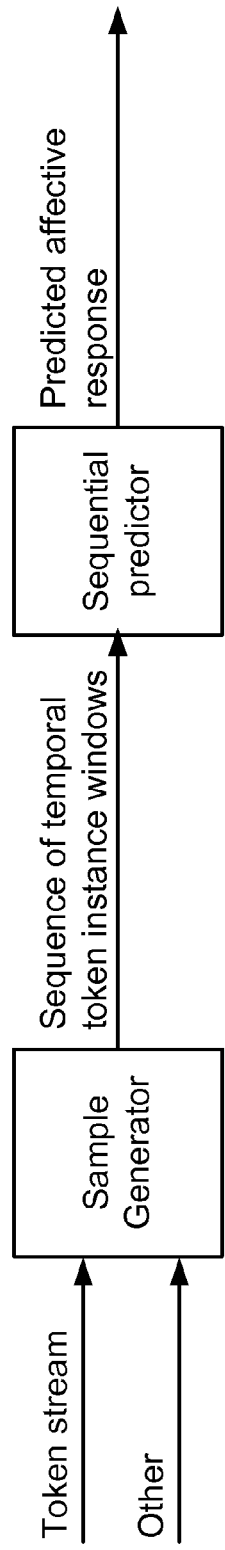
FIG. 15 illustrates an affective response predictor for token stream.
Figure 16:
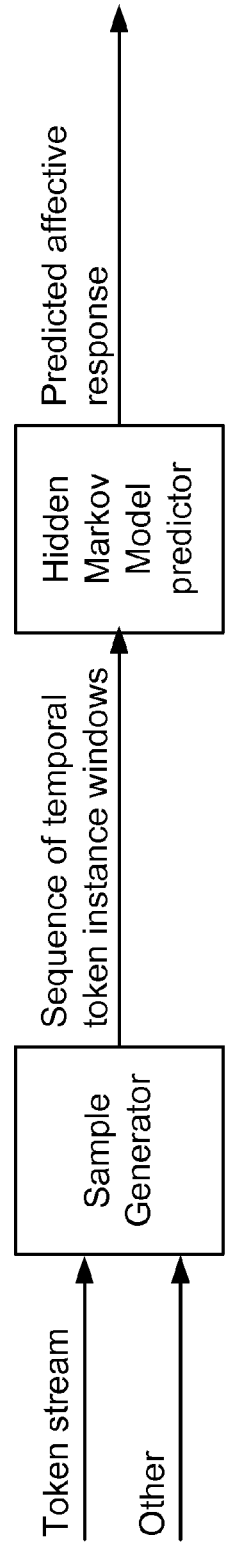
FIG. 16 illustrates an affective response predictor for token stream based on HMM.
Figure 17:
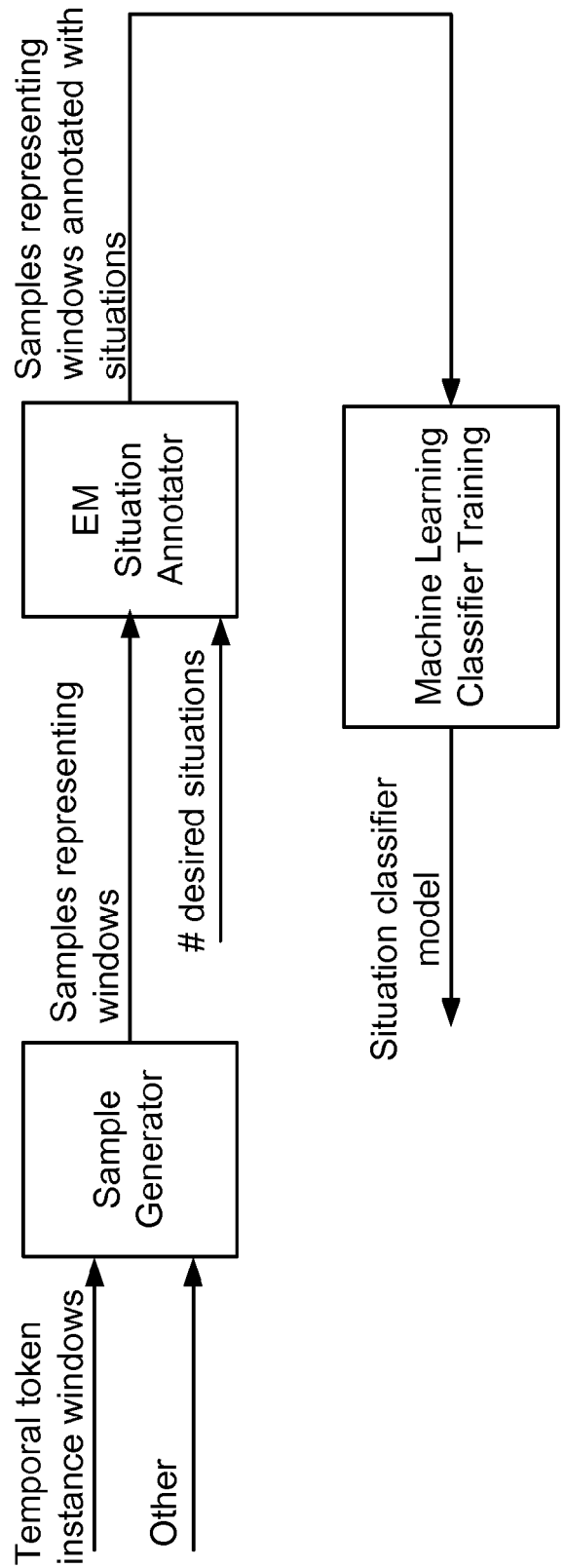
FIG. 17 illustrates an EM-based situation discovery.
Figure 18:
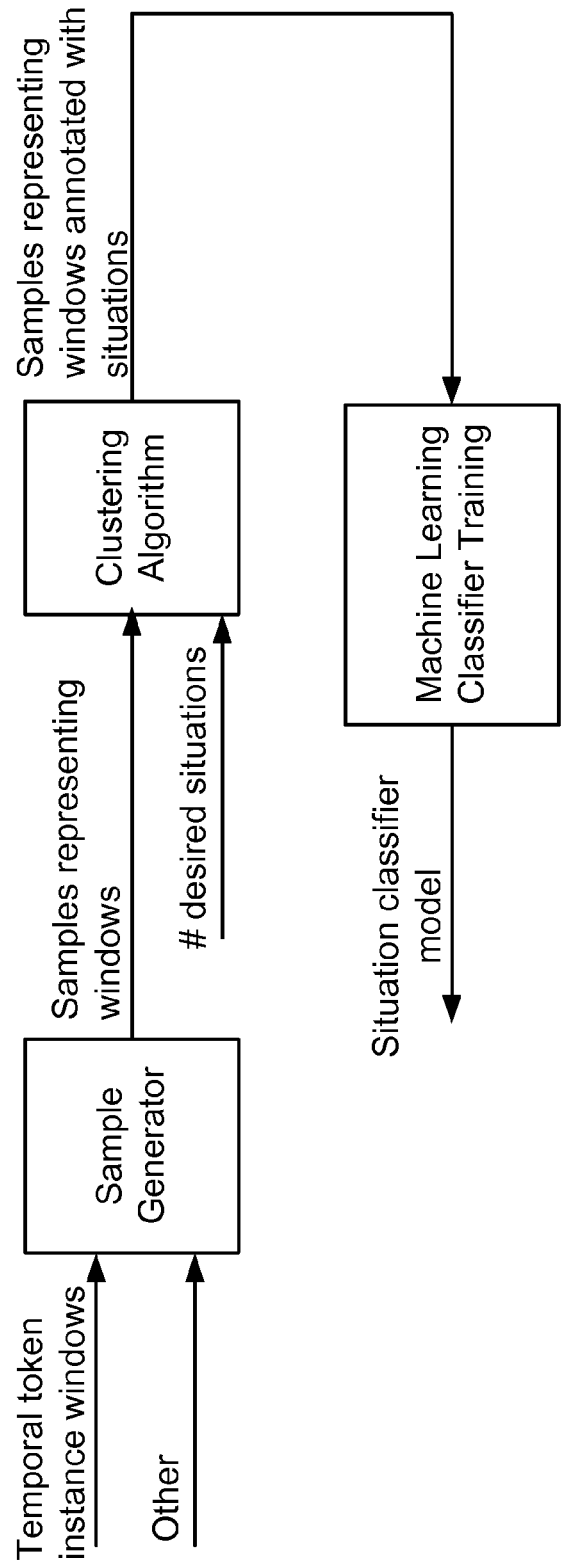
FIG. 18 illustrates a clustering based situation discovery.
Figure 19:
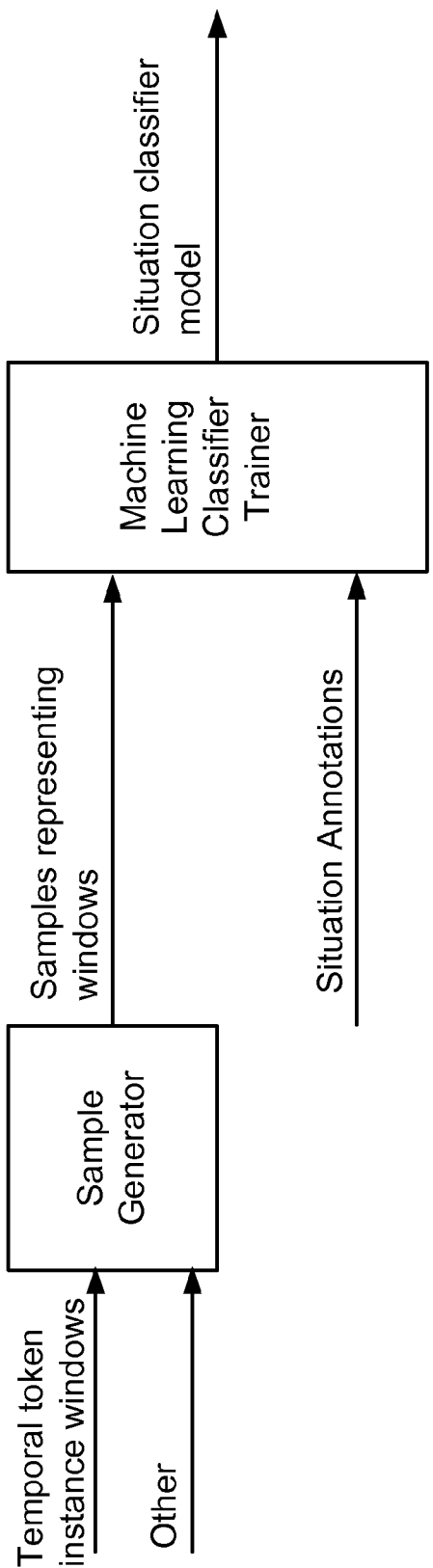
FIG. 19 illustrates an ML based situation predictor.

FIG. 12 illustrates a machine 310 having a memory containing data used to train a machine learning based affective response model 312 for a user. FIG. 13 illustrates one embodiment of a method for generating the machine learning based affective response model 312. The method including the following steps: In step 320, receiving token instances representing stimuli that influence the user's affective state. The token instances are spread over a long period of time that spans different situations and have overlapping instantiation periods. In step 322, receiving data representing levels of user attention in some of the token instances used to improve the accuracy of the machine learning based affective response model for the user. In step 324, receiving annotations representing emotional states of the user. The annotations are spread over a long period of time that spans different situations. And in step 326, training the machine learning based affective response model for the user on the token instances, the data representing levels of user attention in some of the token instances, and the annotations.

Predictors

In one embodiment, a machine learning-based predictor is trained for predicting the user's response when exposed to token instances. Optionally, the predictor predicts the user's affective response when exposed to the token instances. Optionally, the predictor predicts the values corresponding to one or more of the user's measurement channels. Optionally, the predictor may utilize any known or yet-to-be invented machine learning methods for classification or prediction, which operate on data samples and return a predicted target value.

In one embodiment, a machine learning training procedure is supplied training data comprising of samples and corresponding labels or target values. The samples include information derived from token instances. Optionally, samples are derived from temporal token instance windows, for example, by using a vector representation for the windows. Optionally, the samples are preprocessed in various ways, for example, normalizing, filtering, and/or binning some of the values. Optionally, samples are augmented with additional information, for example, baseline values, user measurement channel values, values describing the distance from a baseline, values describing counts of instances in the temporal token instance window (in order to account for saturation), and/or values corresponding to previous instantiation of some of the tokens (in order to account for habituation). Optionally, some samples are assigned weight values, for example, in order for the machine learning procedures to emphasize them appropriately in the training.

In one embodiment, the data used to create the samples for training a machine learning based predictor is collected by monitoring a user over a long period of time (for instance hours, days, months and even years), and/or when the user was in a large number of different situations. Optionally, the training data is comprised of token instances originating from multiple sources of different types. For example, some token instances comprise representations of elements extracted from digital media content. In another example, some token instances comprise representations of elements extracted from an electromechanical device in physical contact with the user. Optionally, the training data is comprised of some token instances with overlapping instantiation periods, i.e., the user may be simultaneously exposed to a plurality of token instances. Optionally, the user may be simultaneously exposed to a plurality of token instances originating from different token sources and/or different types of token sources.

In one embodiment, a machine learning-based predictor is trained for predicting the user's response when exposed to token instances. Optionally the response may be given in the form of a value of a categorical variable. Optionally, the response may be given in the form of a value for scalar variable, such as an integer or real value. Optionally, the response may be given in the form of a value of a multidimensional variable.

In one embodiment, a machine learning-based predictor for a user's multidimensional response value may be obtained by merging the outcome of multiple predictors for single dimensional response values, corresponding to individual dimensions of the desired multidimensional response. In some cases, there are correlations between the dimensions of a multidimensional response, such as when the response is an affective response or the response is given in the form of user measurement channel values. Therefore, in one embodiment, the multidimensional response is predicted in a two stage approach. First, a model for each response dimension is trained independently. In the second stage, a model for each response dimension is trained, wherein the response values for the other dimensions are also provided as an input. The final response is obtained by merging the results from the predictions of the models trained at the second stage. Optionally, a multidimensional predictor may utilize single dimensional predictors using the method of output-associative fusion, as described in Nicolaou, M. A., Gunes, H., & Pantic, M. (2011) Continuous Prediction of Spontaneous Affect from Multiple Cues and Modalities in Valence—Arousal Space, *IEEE Transactions on Affective Computing*, which describes a method in which the correlations between dimensions may be leveraged to increase the accuracy of a multidimensional prediction.

In one embodiment, some of the samples used for training the machine learning-based predictor do not have corresponding labels or target values. In this case, training may be performed using semi-supervised machine learning techniques. Often semi-supervised methods are able utilize unlabeled samples, in order to gain additional accuracy. Optionally, different methods for semi-supervised training are used to train more accurate predictors, such as the methods discussed in Zhu, X. and Goldberg, A. (2009), Introduction to semi-supervised learning. Morgan & Claypool Publishers, which describe various approaches in which the unlabeled data may be utilized in the learning process, such as (i) mixture models in which the model's parameters are learned also from the unlabeled data using an expectation maximization (EM) algorithm; (ii) self-training (also referred to as bootstrapping), wherein the predictor or classifier is used to assign target values to unlabeled samples, and is thus able to increase the body of labeled samples from which it can learn; (iii) co-training, wherein two or more learners are trained on a set of examples and used to classify unlabeled samples, but with each learner using a different sets of features.

In one embodiment, in which there are many more training samples than target values or labels, the target values may be collected or received intermittently. Optionally, by "intermittently", it is meant that there are periods of times in which target values or labels are available, and those periods may be separated by periods of time in which target values or labels are not available. Optionally, by "intermittently", it is also meant that the target values or labels may appear sporadically at times, i.e., single target values or labels may be available at certain times, separated by periods in which there are no target values or labels available.

In one embodiment, the machine learning-based predictor for the user's response to tokens is created by using ensemble methods that aggregate the results of different models. For example, methods applying boosting or bagging.

In one embodiment, various dimensionality reduction feature extraction methods may be used to reduce the data's dimensionality, such as Principal Component Analysis (PCA), or Local Linear Embedding (LLE). In one embodiment, feature selection methods may be used in order to reduce the data dimensionality and remove dimensions that are not relevant to the prediction task.

In one embodiment, a Naive Bayes model is trained on labeled training samples. Optionally, the Naive Bayes model is used as a classifier, returning a categorical response value. Optionally, some of the variables in the samples are converted into binary variables, such that all non-zero values are set to one. Optionally, the values of the variables in the input data are binned, such that the variables are converted to discrete multinomial variables. Optionally, some of the variables are assumed to be distributed according to a parametric distribution such as the Normal distribution. Optionally, the trained Naive Bayes model is comprised of class prior probabilities and class conditional probabilities; the class prior probabilities describe the prior probability for a sample to be labeled with a specific category; the class conditional probabilities describe the probability for a variable to have a specific value given the sample is labeled with a specific label (class).

In one embodiment, a Naive Bayes model is trained using both labeled and unlabeled data. Optionally, the Naive Bayes model is used as a classifier that predicts a categorical response value. Optionally, the model is trained using an Expectation Maximization algorithm comprising the following steps:

(i) Training a Naive Bayes classifier using only the labeled samples to obtain a set of parameters that includes the initial class prior and class conditional probabilities.

(ii) Repeating the following Expectation-Step and Maximization-Step while the classifier's parameters improve the performance, e.g., by reducing the classification error rate on an independent test set: (a) Expectation-Step. Using the current classifier parameters, compute for all samples (both labeled and unlabeled) the probability that the samples belong to each of the classes (these probabilities are referred to as "component probabilities"). (b) Maximization-Step. Re-estimate the classifier parameters from all samples using the updated component probabilities.

(iii) Outputting the parameters with which classifier obtained the best performance.

Optionally, the Naive Bayes model trained in a semi-supervised method comprises class prior probabilities and class conditional probabilities; the class prior probabilities describe the prior probability for a sample to be labeled with a specific category; the class conditional probabilities describe the probability for a variable to have a specific value given the sample is labeled with a specific label (class).

In one embodiment, a maximum entropy model is trained to be used as a classifier that predicts a categorical response value. Maximum entropy models are a multiclass extension of logistic regression models. Optionally, a maximal entropy model uses feature functions of the form f(x,c), where x is an input variable and c is a class. For example, for a certain sample, the value of f(x,c) may behave as follow, if the sample is labeled by class c, f(x,c) returns the value of feature x, otherwise f(x,c) returns 0. A maximal entropy model comprises weighting parameters $\lambda_{i,j}$, for $1 \leq i \leq N$, and $1 \leq j \leq C$, that correspond to the N×C feature functions used to train the model (assuming the input vectors have N features and there are C categories to predict). More information on Maximum entropy models and their training is available, for example, in Berger, A. L. Della Pietre, S. A. Della Pietra, V. J. (1996) Maximum Entropy Approach to Natural Language Processing. Computational Linguistics, 22(1), pages 39-72.

In one embodiment, a neural network model is trained in order to serve as a predictor of a categorical response value, a single dimensional response value, or a multidimensional response value. Optionally, the neural network comprises of an input layer or neurons, one or more hidden layers of neurons, and an output layer of neurons. Optionally, the neural network may utilize a feedforward topology. Alternatively, the neural network may be an Elman/Jordan recurrent neural network trained using back-propagation.

In one embodiment, a random forest is trained in order to serve as a classifier. A random forest is an ensemble method that aggregates the predictions of many decision trees. More information on random forests is available, for example, in Breiman, Leo (2001). "Random Forests". Machine Learning 45 (1): 5-32.

In one embodiment, a regression model is used as a predictor of a single dimensional response variable. Optionally, the regression technique used is Ordinary least squares. Optionally, the regression technique used is weighted least squares (to account for weighted input samples). Optionally, the regression technique used is least angle regression (which has been shown to work well with high-dimensional data). Optionally, the regression technique used is LASSO regression (which includes regularization terms).

In one embodiment, the regression may take the form $y = X \cdot \beta + \epsilon$, where y is the response vector (for example, emotional state arousal values), X is a matrix whose rows are the vectors representing the samples (for example, vector representations of temporal token instance windows), $\beta$ is the model parameter vector, and $\epsilon$ is the error vector. The goal of the training is to minimize the squared error of the difference between y and $X \cdot \beta$.

In one embodiment, regression models are used for predicting a multidimensional response value. Optionally, the multidimensional prediction is done by training separate regression models for each of the predicted dimensions. Optionally, Multiple Response Regression may be used, as described in Hastie, T., Tibshirani, R. and Friedman, J. (2001) The Elements of Statistical Learning. Springer, which describes a regression technique that can leverage the correlations between different dimensions of the response values.

In one embodiment, a support vector machine for regression (SVR) is used as a predictor for a single dimensional response value.

In one embodiment, a Support Vector Machine (SVM) is trained in order to be a predictor for a categorical response value.

In one embodiment, an Input-Output Hidden Markov Model (IOHMM) is trained in order to be a predictor of a multidimensional response value. Like a Hidden Markov Model (HMM), an IOHMM has hidden discrete state variables. However, unlike HMM's, IOHMM also receives input values (in addition to emitting outputs). Each state may use a predictor, such as a neural network to predict the output values given the input values. In addition, similar to HMM, the model also maintains transition probabilities to move between states. More information on IOHMMs is available, for example, in Bengio, Y. and Frasconi, P. (1996). Input/output HMMs for sequence processing. IEEE Trans. on Neural Networks, 7(5):1231-1249. Optionally, some of the training samples may have state assignments, for example, corresponding to situation identifiers, which can be used to initialize some of the parameters in the expectation maximization algorithm used to train the model's parameters.

In one embodiment, a predictor for a user's response after being exposed to a stream of token instances utilizes a machine learning-based prediction algorithm. Optionally, the predicted user response is the user's affective response. Optionally, the predicted user response is a value of a measurement channel of the user.

In one embodiment, training data used to train a machine learning-based predictor for a user's response after being exposed to a stream of token instances is collected by monitoring the user when he/she is exposed to a plurality of streams of token instances, optionally with the streams have varying durations. Optionally, the training data is collected by monitoring the user over a long period of time (for instance hours, days, months and even years), and/or when the user was in a large number of different situations. Optionally, the training data is comprised of token instances originating from multiple sources of different types. For example, some token instances comprise representations of elements extracted from digital media content. In another example, some token instances comprise representations of elements extracted from an electromechanical device in physical contact with the user. Optionally, the training data is comprised of some token instances with overlapping instantiation periods, i.e., the user may be simultaneously exposed to a plurality of token instances. Optionally, the user may be simultaneously exposed to a plurality of token instances with overlapping instantiation periods, possibly originating from different token sources and/or different types of token sources.

The following three methods can utilize the aforementioned training data to train a machine learning-based predictor to predict the user's response after being exposed to a stream of token instances.

(i) In one embodiment, a method for predicting a user's response after being exposed to a stream of token instances represents a stream of token instances using a single temporal window of token instances. The stream of token instances is converted into a single vector representing a temporal token instance window with a length approximately matching the duration of the token instance stream. Optionally, some of the values in the vector representing the temporal token instance window, such as token instance weights, are normalized according to the duration of the stream of token instances. For example, the weights are divided by the duration of the stream in minutes, in order to be compatible with windows representing streams of other durations. Optionally, the duration of the token instance stream is provided as an additional input value as part of the vector representation of the temporal token instance window. Optionally, additional information is incorporated into the vectors of the training data, such as variables identifying the situation in which the user is at the time, and/or variables describing a baseline level.

In one embodiment, the training data comprising a plurality of token instance streams to which the user was exposed is converted into temporal token instance windows, of possibly variable durations (one window per token instance stream), and the user's response is noted before and after the exposure to the stream of tokens. Optionally, the user's response before the exposure to the stream of tokens may be provided as part of the sample's data, while the response after the exposure to the token instance stream may serve as the target value for prediction. Optionally, the difference between the response after the exposure and the response before the exposure to the stream of token instances is used as the target value for prediction.

In one embodiment, training data is collected and used to train a machine learning-based predictor such as a recurrent neural network, support vector machine for regression, or regression model. Given a new stream of tokens, and optionally, the user's response before exposure, the trained predictor may be used to predict the user's response after an exposure to the stream of token instances, by converting the stream of token instances into a single vector representing a temporal token instance window, and returning the predictor's result on the single vector.

(ii) In one embodiment, a method for predicting a user's response after being exposed to a stream of token instances uses a representation for the stream of token instances as multiple vectors; wherein the vectors represent consecutive temporal token instance windows of a substantially fixed duration, for example 10 seconds. Training data comprising a plurality of token instance streams to which the user was exposed is collected and converted into temporal token instance windows of fixed duration. The user's response is noted both at the beginning of temporal token instance windows, and at their end. Optionally, the user's response at the beginning of the window may be provided as part of the sample vector data, while the response at the end of the window may serve as the target value for prediction. Optionally, the difference between the response at the beginning and end of the window may be used as the target value for prediction. Optionally, additional information is incorporated into the vectors of the training data, such as variables identifying the situation in which the user is at the time, and/or variables describing a predicted baseline level.

In one embodiment, training data is collected and used to train a machine learning-based predictor such as a recurrent neural network, support vector machine for regression, or regression model. Given a new stream of tokens, and optionally, the user's response before exposure, the model may be used to predict the user's response after the exposure to the stream of token instances. The stream of token instances is converted into a sequence of vectors representing consecutive temporal token instance windows of a substantially fixed duration. The prediction may proceed as follows. At the first step, the value of the user's response before exposure to the stream of tokens instances is used for the user's response value at the beginning of the first window. The user's response value after exposure to the first window is then predicted using the trained predictor. This predicted response then serves as the value of the user's response before the exposure to the second window and so on. Thus, the predicted response to window i serves as the initial response value of window i+1. This process proceeds until the user's response, after being exposed to the token instances of the last window, is predicted. This last predicted response value is returned as the user's response to being exposed to the entire stream of token instances.

(iii) In one embodiment, a method for predicting a user's response after being exposed to a stream of token instances uses a Hidden Markov Model (HMM). This method uses categorical state values to represent the user response, for example, emotional state categories such as anger, happiness, sadness, excitement, surprise. A stream of token instances is represented as multiple vectors; wherein the vectors represent consecutive temporal token instance windows of a fixed duration, for example 10 seconds. Training data comprising one or more token instance streams to which the user was exposed is collected and converted into temporal token instance windows of a fixed duration. The user's categorical state value during each window is also noted and used as the label for the windows. Optionally, additional information is incorporated into the samples of the training data, such as variables identifying the situation in which the user is at the time, and/or variables describing a predicted baseline level.

In one embodiment, collected training data is used to train a Hidden Markov Model (HMM), in which the hidden states represent the categorical state values used to label the windows and the emitted symbols are the token instances observed in each window. The training data comprises sets of sequences of windows created from streams of token instances. Training the HMM involves finding a maximum likelihood estimate for parameters such as transition probabilities between states and the emission probabilities (the probability of observing token instances in the different states). Optionally, the parameters are set using a forward-backward algorithm, such as the Baum-Welch algorithm that uses an Expectation Maximization approach. Given a new stream of tokens, the HMM can be used to predict the user's response after being exposure to the stream as follows. First, the stream is converted into a sequence of vectors representing temporal token instance windows of a fixed duration. Then a dynamic programming algorithm, such as the Viterbi algorithm, may be used to predict the most likely final state, in addition to the most likely path of states in which the user may be if exposed to the stream of token instances. Optionally, the user's initial state, which is the response level before exposure to the stream of token instances, may be used as the first state in the predicted path of states. Otherwise, the dynamic programming algorithm may consider all states as possible initial states according to prior probabilities learned during the HMM model training.

Libraries

In one embodiment, a machine learning-based user response model is analyzed in order to generate a library of the user's expected response to tokens representing stimuli to which the user may be exposed. In one embodiment, the user's response is expressed as an expected affective response and/or expected change to the user's affective response. In one embodiment, the response is expressed as the expected value and/or change in value for one or more user measurement channels. Optionally, the training data used to generate the model comprises of samples generated from temporal token instance windows and target values corresponding to the token windows, which represent the user's response to the token instances from the temporal window of token instances.

In one embodiment, a library of the user's expected response to tokens comprises various values and/or parameters extracted from the user's machine learning-based user response model. Optionally, the extracted values and/or parameters indicate the type and/or extent of the user's response to some tokens. Optionally, the extracted values and/or parameters indicate characteristics of the user's response dynamics, for example, how the user is affected by phenomena such as saturation and/or habituation, how fast the user's state returns to baseline levels, how the response changes when the baseline is at different levels (such as when the user is aroused vs. not aroused).

In one embodiment, a library comprises values generated by monitoring the results of experiments in which a user's machine learning-based user response model was run on various data samples. For example, experiments in which specific samples (for example, with specific token instances) were run through the model in order to gain insights into the user's response to the specific token instances. Optionally, the experiments may involve perturbed data, for example, by modifying the weight of certain token instance in order to observe how the response changes as a function of the modified input level.

In one embodiment, a library of the user's expected response to tokens is generated, wherein the response is expressed as a multidimensional value. For example, the response may be an affective response represented as a point or vector in a multidimensional space. In another example, the response may be the value of a plurality of user measurement channels. Optionally, the library may comprise responses to token, expressed as multidimensional values, for example a point or a vector in a multidimensional space. Optionally, the library may comprise separate responses for the token for each of dimension in the multidimensional space used to represent the response value.

In one embodiment, the machine learning-based user response model used to generate the library of the user's expected response to tokens is trained on data collected by monitoring a user over a long period of time (for instance hours, days, months and even years), and/or when the user is in a large number of different situations. Optionally, the training data is comprised of token instances originating from multiple sources of different types. For example, some token instances comprise representations of elements extracted from digital media content. In another example, some token instances comprise representations of elements extracted from an electromechanical device in physical contact with the user. Optionally, the training data is comprised of some token instances with overlapping instantiation periods, i.e., the user may be simultaneously exposed to a plurality of token instances. Optionally, the user may be simultaneously exposed to a plurality of token instances originating from different token sources and/or different types of token sources. Optionally, some of the token instances originate from different token sources, and are detected by the user using essentially different sensory pathways (routes that conduct information to the conscious cortex of the brain).

In one embodiment, the training data collected by monitoring the user, is collected during periods in which the user is in a large number of different situations. Optionally, the data is partitioned into multiple datasets according to the different sets of situations in which the user was in when the data was collected. Optionally, each partitioned training dataset is used to train a separate situation-dependent machine learning-based user response model, from which a situation-dependent library may be derived, which describes the user's expected response to tokens when the user is in a specific situation.

In one embodiment, data related to previous instantiations of tokens is added to some of the samples in the training data. This data is added in order for the trained machine learning-based user response model to reflect the influences of habituation. Thus, the library generated from the machine learning model may be considered a habituation-compensated library, which accounts for the influence of habituation on the user's response to some of the token instances. In some cases, habituation occurs when the user is repeatedly exposed to the same, or similar, token instances, and may lead to a reduced response on the part of the user when exposed to those token instances. By contrast, in some cases the user's response may gradually strengthen if repeatedly exposed to token instances that are likely to generate an emotional response (for example, repeat exposure to images of a disliked politician).

To account for the aforementioned possible influence of the user's previous exposures to tokens, in one embodiment, certain variables may be added explicitly to some of the training samples. Optionally, the added variables may express for some of the tokens information such as the number of times the token was previously instantiated in a given time period (for example, the last minute, hour, day, or month), the sum of the weight of the previous instantiations of the token in the given time period, and/or the time since the last instantiation of the token. Optionally, the habituation-related information may be implicit, for example by including in the sample multiple variables corresponding to individual instantiations of the same token in order to reflect the fact that the user had multiple (previous) exposures to the token.

In one embodiment, a classifier is provided in order to classify some of the tokens into classes. For example, two token instances representing images of people may be classified into the same class. Optionally, information may be added to some of the training samples, regarding previous instantiations of tokens from certain classes, such as the number of times tokens of a certain class were instantiated in a given time period (for example, the last minute, hour, day, or month), the sum of the weight of the previous instantiations of tokens of a certain class in the given time period, and/or the time since the last instantiation of any token from a certain class.

In one embodiment, data related to the collection of token instances the user is exposed to simultaneously, or over a very short duration (such as a few seconds), is added to some of the samples in the training data. This data is added so the trained machine learning-based user response model, from which the library is generated, will be able to model the influence of saturation on the user's response, and thus creating a saturation-compensated library. In some cases, saturation occurs when the user is exposed to a plurality of token instances, during a very short duration, and may lead to a reduced response on the part of the user (for instance due to sensory overload). Therefore, in one embodiment certain statistics may be added to some of the training samples, comprising information such as the number token instances the user was exposed to simultaneously (or during a short duration such as two seconds) and/or the weight of the token instances the user was exposed to simultaneously (or in the short duration). Optionally, a classifier that assigns tokens to classes based on their type can be used in order to provide statistics on the user's simultaneous (or near simultaneous) exposure to different types of token instances, such as images, sounds, tastes, and/or tactile sensations.

In one embodiment, the machine learning-based user response model used to generate a library of the user's expected response to tokens, is trained on data comprising significantly more samples than target values. For example, many of the samples comprising temporal token instance windows do not have corresponding target values. Thus, most of the samples may be considered unannotated or unlabeled. Optionally, the user's machine learning-based user response model is trained using a semi-supervised machine learning training approach such as self-training, co-training, and/or mixture models trained using expectation maximization. In some cases, the models learned by semi-supervised methods may be more accurate than models learned using only labeled data, since the semi-supervised methods often utilize additional information from the unlabeled data, thus being able to compute things like distributions of feature values more accurately.

In one embodiment, a library of the user's expected response to tokens may be accessed or queried using various methods. In one example, the library may be queried via a web-service interface. Optionally, the web-service is provided a user identification number and an affective response, and the service returns the tokens most likely to elicit the desired response. Optionally, the system is provided a token, and the system returns the user's expected response. Optionally, the service is provided a token, and the system returns a different token expected to elicit a similar response from the user.

In one embodiment, a Naive Bayes model is trained in order to create a library of a user's expected affective response to token instances representing stimuli. Optionally, the affective response is expressed using C emotional state categories. Optionally, the library comprises prior probabilities of the form $p(c)$, $1 \leq c \leq C$, and class conditional probabilities of the form $p(k|c)$, where k is an index of a token from 1 to N (total number of tokens). Optionally, the probability $p(c|k)$ is computed using Bayes rule and the prior probabilities and the class conditional probabilities. Optionally, for each class, the tokens are sorted according to decreasing probability $p(c|k)$, thus the library may comprise ranked lists of tokens according to how likely (or unlikely) they are to be correlated with a certain emotional states with the user.

In one embodiment, a maximum entropy model is trained in order to create a library of the use's expected response to token instances representing stimuli. Optionally, the model comprises the parameters $\lambda_{i,j}$, for $1 \leq i \leq N$, and $1 \leq j \leq C$, that correspond to the N×C feature functions used to train the model (assuming the input vectors have N features and there are C emotional state categories to classify to), and creating j lists of the form $\lambda_{1,j} \ldots \lambda_{N,j}$, one for each emotional state class $j=1 \ldots C$. Optionally, For each class $j=1 \ldots C$ the parameters $\lambda_{1,j} \ldots \lambda_{N,j}$ are sorted according to decreasing values; the top of the list (most positive $\lambda_{i,j}$ values) represents the most positively correlated token instances with the class (i.e., being exposed to these token instances increases the probability of being in emotional state class j); the bottom of the list (most negative $\lambda_{i,j}$ values) represents the most negatively correlated token instances with the class (i.e., being exposed to these token instances decreases the probability of being in emotional state class j). Optionally, some input variables (for example, representing token instances) are normalized, for instance to a mean 0 and variance 1, in order to make the weights assigned to feature functions more comparable between token instances.

In one embodiment, a regression model is trained in order to create a library of the use's expected single dimensional real-valued response to token instances representing stimuli. Optionally, the model comprises the regression parameters $\beta_i$, for $1 \leq i \leq N$, that correspond to the N possible token instances included in the model. Optionally, the parameters $\beta_1, \ldots \beta_N$ are sorted; the top of the list (most positive $\beta_i$ values) represents the token instances that most increase the response variable's value; the bottom of the list (most negative $\beta_i$ values) represents the most negatively correlated token instances with the class (i.e., being exposed to these token instances decreases the probability of being in emotional state class j). Optionally, some input variables (for example, representing token instances) are normalized, for instance to a mean 0 and variance 1, in order to make the parameters corresponding to different variables more comparable between token instances. Optionally, the regression model is a multidimensional regression, in which case, the response for each dimension may be evaluated in the library separately.

In one embodiment, parameters from the regression model may be used to gain insights into the dynamics of the user's response. In one example, a certain variable in the samples holds the difference between a current state and a predicted baseline state, for instance, the user's arousal level computed by a prediction model using user measurement channel vs. the user's predicted baseline level of arousal. The magnitude of the regression parameter corresponding to this variable can indicate the rate at which the user's arousal level tends to return to baseline levels. By comparing the value of this parameter in the user's model, with the values of the parameter in other people's models, insight can be gained into how the user compares to the general population.

In one embodiment, a neural network model is trained in order to create a library of the use's expected response to token instances representing stimuli. Optionally, the response may be represented by a categorical value, a single dimensional value, or a multidimensional value. Optionally, the neural network may be an Elman/Jordan recurrent neural network trained using back-propagation. Optionally, the model comprises information derived from the analysis of the importance and/or contribution of some of the variables to the predicted response. For example, by utilizing methods such as computing the partial derivatives of the output neurons in the neural network, with respect to the input neurons. In another example, sensitivity analysis may be employed, in which the magnitude of some of the variables in the training data is altered in order to determine the change in the neural network's response value. Optionally, other analysis methods for assessing the importance and/or contribution of input variables in a neural network may be used.

In one embodiment, a library comprises of sorting token instances according to the degree of their contribution to the response value, for example, as expressed by partial derivatives of the neural network's output values (the response), with respect to the input neurons that correspond with token instances. Optionally, the list of tokens may be sorted according to the results of the sensitivity analysis, such as the degree of change each token induces on the response value. Optionally, some input variables (for example, representing token instances) are normalized, for instance to a mean 0 and variance 1, in order to make the parameters corresponding to different variables more comparable between token instances. Optionally, the neural network model used to generate a response, predicts a multidimensional response value, in which case, the response for each dimension may be evaluated in the library separately.

In one embodiment, a random forest model is trained in order to create a library of the user's expected response to token instances representing stimuli. Optionally, the response may be represented by a categorical value, for example an emotional state, or categories representing transitions between emotional states. Optionally, the training data may be used to assess the importance of some of the variables, for example by determining how important they are for classifying samples, and how important they are for classifying data correctly in a specific class. Optionally, this may be done using data permutation tests or the variables' GINI index, as described at http://stat-www.berkeley.edu/users/breiman/RandomForests/cc_home.htm.

In one embodiment, the library may comprise ranked lists or tokens according to their importance toward correct response classification, and towards correct classification to specific response categories. Optionally, some input variables (for example, representing token instances) are normalized, for instance to a mean 0 and variance 1, in order to make the parameters corresponding to different variables more comparable between token instances.

FIG. 1 illustrates a machine learning based system for generating a library of affective response to tokens 204. Sample generator 114 receives token instances 110, and optionally other inputs 113 that may include for example the user's baseline 112, situation data, habituation data, and/or saturation data. The sample generator 114 generate a representation of the token instances and the other value inputs 116. Target value generator 104 receives the user measurement channels 102 of the user, and optionally other inputs 103. The Target value generator 104 generates affective response annotations 106. A machine learning trainer 120 receives the representation of the token instances and the other value inputs 116 and the affective response annotations 106, and generates an emotional state model 122 that is analyzed by a model analyzer 202 to generate the library of affective response to tokens 204.

Figure 2:
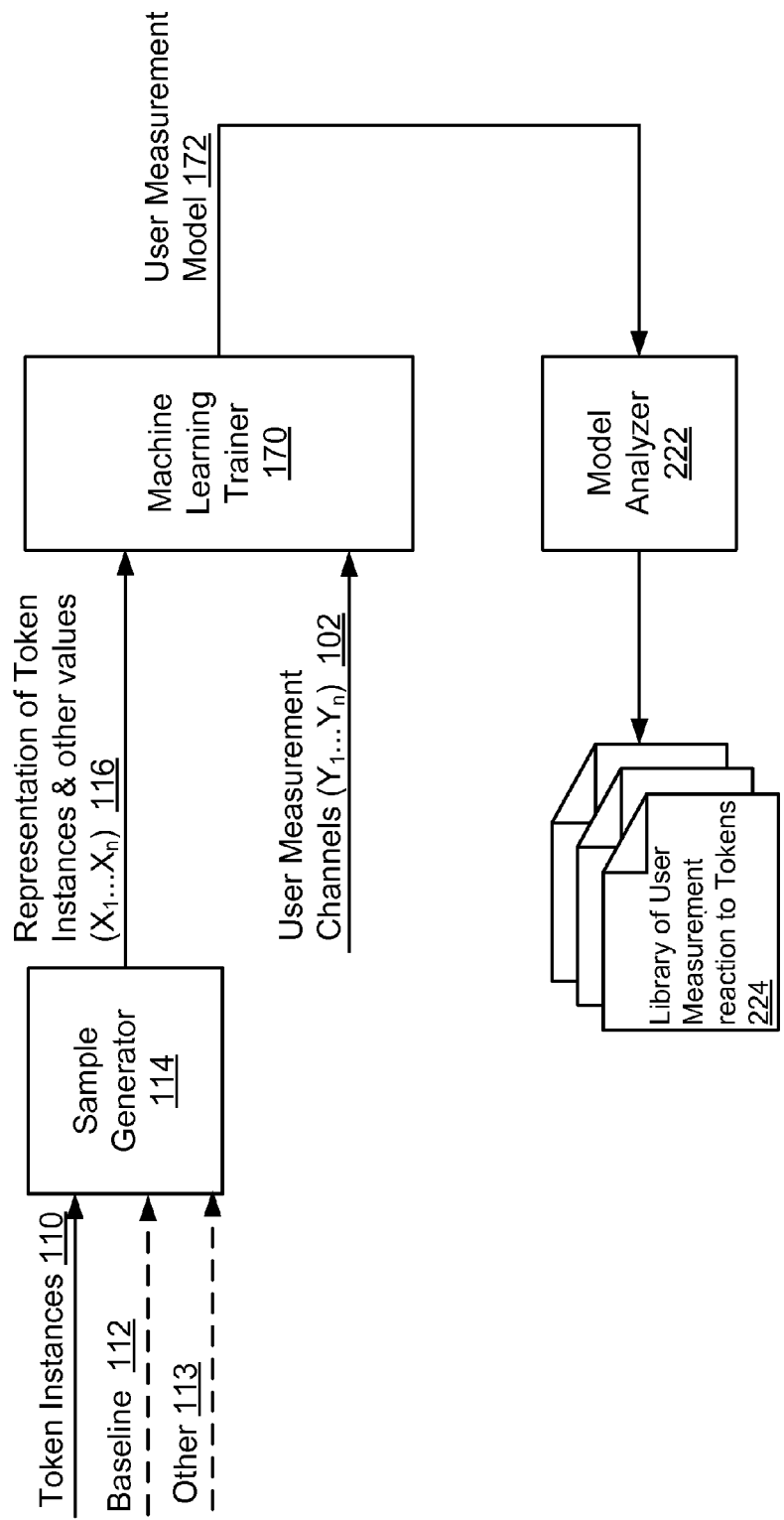
FIG. 2 illustrates a measurement library from machine learning.

FIG. 2 illustrates a machine learning based system for generating a library of user measurement reaction to tokens 224. A machine learning trainer 170 receives the representation of the token instances and the other value inputs 116 and the user measurement channels 102, and generates user measurement model 172 that is analyzed by a model analyzer 222 to generate the library of user measurement reaction to tokens 224.

Figure 3:
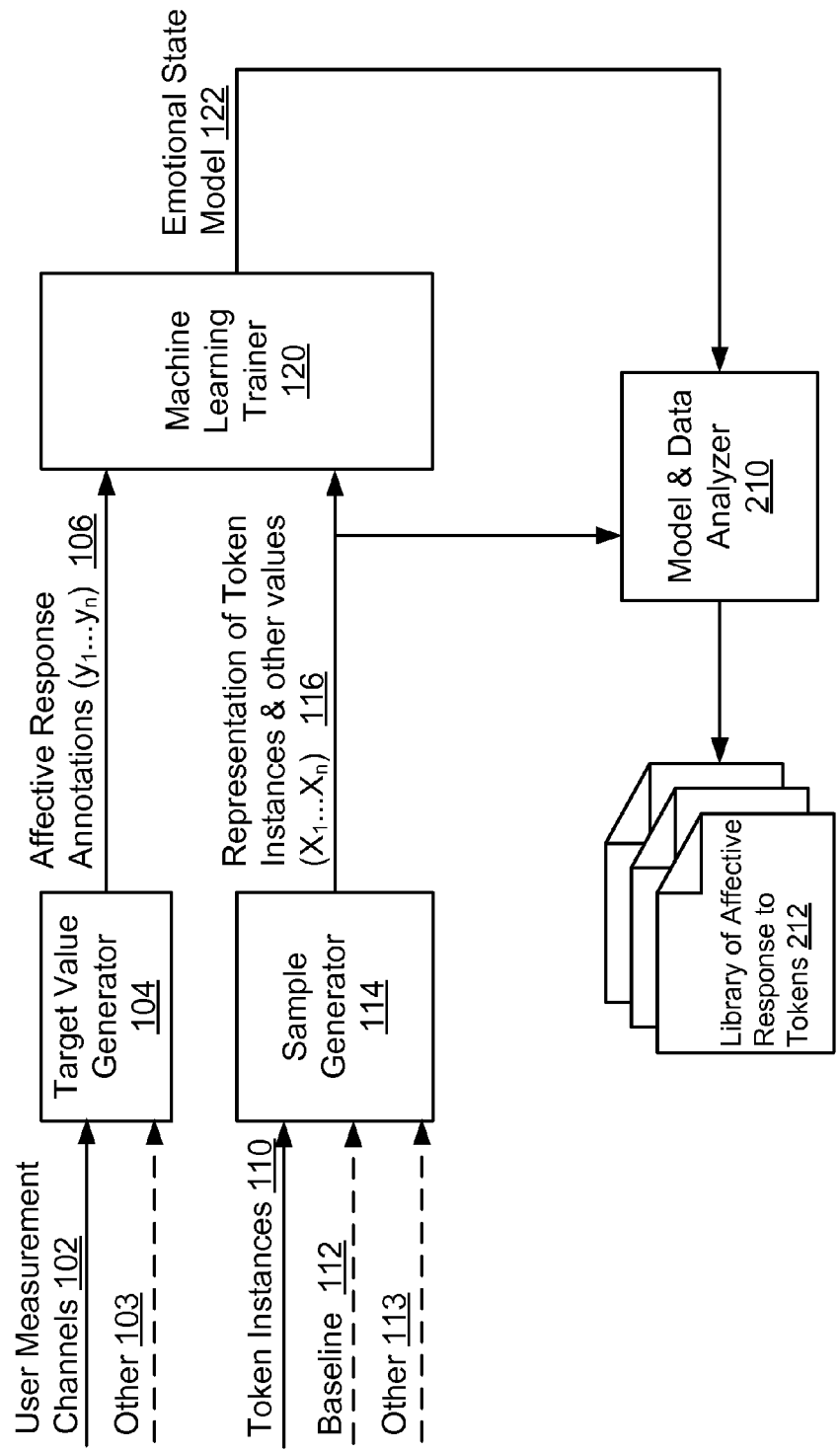
FIG. 3 illustrates an affective response library with input base dynamic analysis.

FIG. 3 illustrates a machine learning based system with input base dynamic analysis for generating a library of affective response to tokens 212. Sample generator 114 receives token instances 110, and optionally other inputs 113 that may include for example the user's baseline 112, situation data, habituation data, and/or saturation data. The sample generator 114 generate a representation of the token instances and the other value inputs 116 that is forwarded to both a machine learning trainer 120 and a model and data analyzer 210. The machine learning trainer 120 receives representation of the token instances and the other value inputs 116 and the affective response annotations 106, and generates an emotional state model 122 that is analyzed by the model and data analyzer 210, together with the representation of the token instances and the other value inputs 116, to generate the library of affective response to tokens 212.

Figure 4:
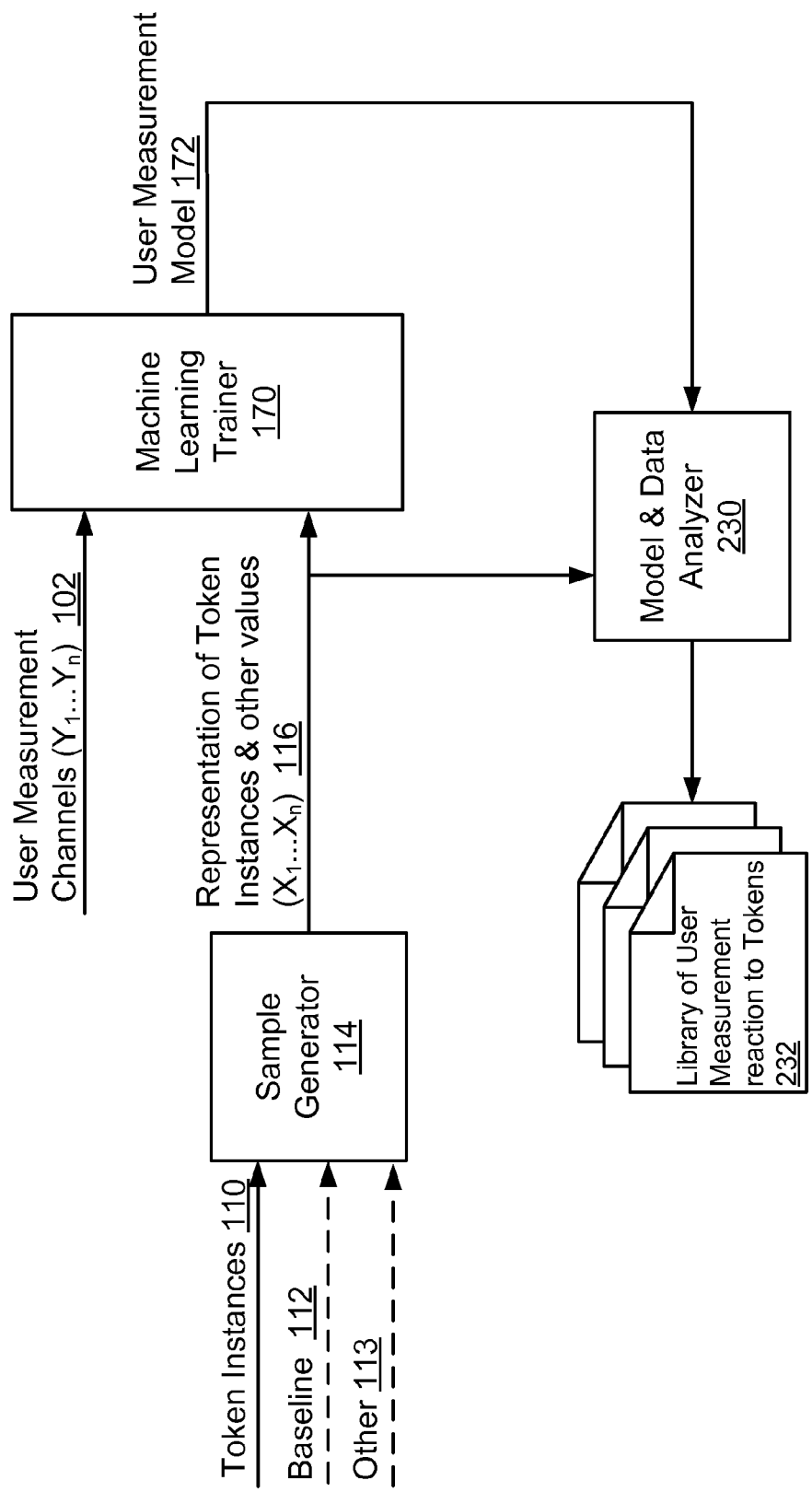
FIG. 4 illustrates a measurement library with input base dynamic analysis.

FIG. 4 illustrates a machine learning based system with input base dynamic analysis for generating a library of user measurement reaction to tokens 232. Sample generator 114 receives token instances 110, and optionally other inputs 113 that may include the user's baseline 112. The sample generator 114 generate a representation of the token instances and the other value inputs 116 that is forwarded to both a machine learning trainer 170 and a model and data analyzer 230. The machine learning trainer 170 receives representation of the token instances and the other value inputs 116 and the user measurement channels 102, and generates a user measurement model 172 that is analyzed by the model and data analyzer 230, together with the representation of the token instances and the other value inputs 116, to generate the library of user measurement reaction to tokens 232.

FIG. 5 illustrates a statistics based system for generating a library of association between tokens and annotations 252. A statistical analyzer of samples and annotations 250 receives the representation of the token instances and the other value inputs 116 and the affective response annotations 106, and generates the library of association between tokens and annotations 252.

FIG. 6 illustrates a statistics based system for generating a library of association between tokens and user measurements 262. A statistical analyzer of samples and measurement 260 receives the representation of the token instances and the other value inputs 116 and the user measurement channels 102, and generates the library of association between tokens and user measurements 262.

In one embodiment, data collected by monitoring a user over a long time, and optionally, over multiple situations, is used to create an affective response model for a user. The affective response to a token and/or a pattern of tokens may be represented as a probability and/or p-value of observing the token or pattern of tokens in a window labeled by a certain emotional category. Alternatively, the affective response to a token and/or a pattern of tokens may be represented as a probability and/or p-value of observing the token or pattern of tokens in a window with specific pre-window and post-window emotional states.

In one embodiment, the training procedure for the affective response model utilizes a database of windows D, where the windows may be labeled using C emotional state categories. Optionally, the database D is partitioned into C separate window databases ($D_1, \ldots, D_C$) according to the emotional category used to label the windows. Optionally, the database D is partitioned into $C^2$ separate window databases ($D_{1,1}, \ldots, D_{1,C}, \ldots, D_{C,C}$) grouping together windows that have the same pre-window and post-window emotional states labels.

In one embodiment, one or more algorithms for finding frequent itemsets may be run on each of the N partitioned databases to find the most frequent patterns of tokens in each partitioned database. Let $F_i$ denote the set of all frequent patterns of tokens found for partitioned database $D_i$, the set of all frequent token patterns in D is given by $F=F_1 \cup F_2 \ldots \cup F_N$. Let Q denote the set of tokens appearing in patterns in F, i.e., $Q=\{token\ k | k \in P, \{\in F\}$.

In one embodiment, the number of windows in the databases $D_i$, $1 \leq i \leq N$, in which pattern P appears at least once, is denoted by $O[P|i]$. Optionally, the values $O[P|i]$ may be computed efficiently by creating a Frequent Pattern growth tree (FP-tree) for each partition database $D_i$ using all the tokens that appear in one or more of the token subsets in F. Optionally, the counts $O[P|i]$ are smoothed, for example by adding ½ to all counts, in order to avoid zero probabilities and p-values. The total number of windows in D where pattern P appeared at least once is given by $O[P]=\Sigma_{i=1 \ldots N} O[P|i]$. The number of windows in $D_i$ is denoted $O[Di]$, and the number of windows in D is given by $O[D]=\Sigma_{i=1 \ldots N} O[D_i]$.

In one embodiment, a null hypothesis is used for creating the model. Optionally, according to the null hypothesis, token instances do not influence the user's emotional state, as represented by the labeled state of the window and/or the pre- and post-window states. Therefore, under this null hypothesis, the probability of a window being in partition i, denoted p(i), is given by $p(i)=O[D_i]/O[D]$.

In one embodiment, under the null hypothesis, the expected number of windows in $D_i$, in which a pattern P is observed is given by $E[P|i]=p(i) \cdot O[P]$.

In one embodiment, a statistical test may be used to determine if the difference between $E[P|i]$ and $O[P|i]$ is statistically significant, which may indicate that the null hypothesis is wrong and that the emotional state is influenced by the observed token sets. Optionally, the significance of a pattern P appearing in $D_i$ is computed using Pearson's chi-square test. A p-value for observing P in some of the windows of $D_i$ may be obtained by looking up the Pearson's cumulative test statistic, which asymptotically approaches a $\chi^2$ distribution, or by approximating it using a binomial distribution.

In one embodiment, the probabilities and/or p-values computed for observing a token or pattern of tokens in windows of various partitions are used to create an affective response model for the user.

In one embodiment, the affective response model may be used to create a library for the affective response to patterns and/or tokens, by including one or more of the following:

(i) For each partition i, $1 \leq i \leq N$, and pattern P, the probability of observing P at least once in a window in the partition $D_i$, is given by $p(P|i)=O[P|i]/O[D_i]$).

(ii) For each partition i, $1 \leq i \leq N$, and pattern P, the p-value computed for observing P. For example, from computing Pearson's test statistic for the difference between $E[P|i]$ and $O[P|i]$.

(iii) For each partition i, $1 \leq i \leq N$, and token k, the probability of observing k in a window $D_i$, denoted $p(k|i)=O[k|i]/O[k|i]/O[D_i]$. Optionally, $p(k|i)$ may denote the probability of observing a token instances with a certain weight in $D_i$, in which case it may be given as $p(k=w|i)=w(k,i)/W(i)$, where $w(k,i)$ is the sum of the weights given to all instances of token k in windows in $D_i$ (extracted from the vector representation of the windows), and $W(i)$ is the weight of all tokens in $D_i$, obtained by summing all the weights in the vectors of windows in $D_i$. Optionally, values $w(k,i)$ are smoothed by adding a small pre-defined weight in order to avoid zero-valued probabilities.

Optionally, the lists of patterns and/or tokens with their corresponding probabilities may be filtered to keep a fixed number of patterns with the highest probability, and/or keep patterns with a p-value below a certain value.

In one embodiment, some sets of token instances may be replaced by patterns of more than one token. For example, by scanning the vector representation of the window and looking for the various patterns in the library. Optionally, the search for patterns may proceed from longest patterns to the shortest ones, or ordered according to their p-values. Once a pattern of tokens in detected, its instances may be replaced by an instance of a new "pattern token". Optionally, the attributes of the pattern token may be computed from the attribute values of the instances that made it up. For example, the pattern instances weight may equal the sum of its token instance weights, and size may equal the average value of the size attribute of the token instances. Optionally, a window may be considered for the purpose of analysis, to contain only token pattern instances, where all token instances not part of larger patterns, are considered patterns of one token instance (singletons).

In one embodiment, where the window database D is partitioned into C partitions describing the emotional state label given to windows in D, the affective response library may be used to compute the probability of a window being in state i given patterns of tokens $P_1, \ldots, P_n$, using Bayes rule as follows:

$$P(i|P_1, \ldots, P_n) = \pi_{j=1 \ldots n} p(P_j|i) \cdot p(i) / \Sigma_{i=1 \ldots C} [\pi_{j=1 \ldots n} p(P_j|i) \cdot p(i)].$$

In one embodiment, where the window database D is partitioned into $C^2$ partitions describing the pre-window and post-window emotional state labels given to windows in D, the affective response library may be used to compute the probability of a user transitioning from emotional state i to state j, $1 \leq i,j \leq C$, given the patterns in that window were $P_1, \ldots, P_n$, may be computed using Bayes rule, as follows:

$$P(i,j|P_1, \ldots, P_n) = \pi_{j=1 \ldots n} p(P_j|i,j) \cdot p(i,j) / \Sigma_{i=1 \ldots C} [\pi_{j=1 \ldots n} p(P_j|i,j) \cdot p(i,j)]$$

Therefore, $P(j|i, P_1, \ldots, P_n) = P(i,j|P_1, \ldots, P_n)/p(i)$.

In this description, numerous specific details are set forth. However, the embodiments of the invention may be practiced without some of these specific details. In other instances, well-known hardware, software, materials, structures, and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to also cover the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, it is intended to embrace all such alternatives, modifications, and variations that fall within the spirit and scope of the appended claims and their equivalents.

What is claimed is:

1. A method comprising:
receiving samples comprising temporal windows of token instances to which a user was exposed; the token instances spread over at least a day, and a subset of the token instances originating from a same source and having overlapping instantiation periods;
receiving target values representing affective response annotations of the user in response to the temporal windows of token instances; and
training an emotional response predictor on input data comprising: the samples, the corresponding target values, and values indicative of the number of token instances in the temporal windows of token instances; wherein the emotional response predictor utilizes the values indicative of the number of the token instances to compensate for non-linear effects resulting from saturation of the user due to the user being exposed to the token instances in the temporal windows of token instances including the token instances originating from the same source and having overlapping instantiation periods.

2. The method of claim 1, further comprising using the emotional response predictor for predicting emotional state of the user after being exposed to a sample comprising a new temporal window of token instances.

3. The method of claim 1, wherein the token instances are spread over a week during which the user is in different situations, and the emotional response predictor captures situation dependent variations in the affective response of the user.

4. The method of claim 3, wherein training the emotional response predictor involves training at least two different machine learning-based emotional response predictors on data collected over periods where the user was in different situations.

5. The method of claim 1, wherein the training sets parameters of a regression model utilized by the emotional response predictor to make its predictions.

6. The method of claim 1, wherein the training sets weights of a neural network utilized by the emotional response predictor to make its predictions.

7. The method of claim 1, wherein the training sets parameters of a support vector machine for regression utilized by the emotional response predictor to make its predictions.

8. The method of claim 1, wherein the training sets parameters of a maximum entropy model classifier utilized by the emotional response predictor to make its predictions.

9. The method of claim 1, wherein the training sets parameters of a random forest model utilized by the emotional response predictor to make its predictions.

10. The method of claim 1, wherein the training sets parameters of a Naive Bayes classifier utilized by the emotional response predictor to make its predictions.

11. The method of claim 1, wherein the training comprises training multiple predictors; and further comprising combining the predictions of the multiple predictors using an ensemble method.

12. The method of claim 1, further comprising receiving the token instances and a baseline value for the user; and generating the samples from the token instances and the baseline value for the user.

13. The method of claim 1, further comprising receiving the token instances and initial user measurement channel values representing state of the user at beginning of some of the temporal windows of token instances; and generating the samples from the token instances and the initial user measurement channel values.

14. The method of claim 1, further comprising receiving the token instances and initial affective response values representing state of the user at beginning of some of the temporal windows of token instances; and generating the samples from the token instances and the affective response value for the user.

15. The method of claim 1, further comprising receiving additional samples comprising temporal windows of token instances that do not have corresponding target values, and training the emotional response predictor utilizing a semi-supervised training method.

16. A method comprising:
receiving samples comprising temporal windows of token instances, to which a user was exposed, comprising representations of elements extracted from digital media content; the token instances spread over at least a day, and a subset of the token instances originating from a same digital media source and having overlapping instantiation periods;
receiving target values corresponding to the temporal windows of token instances; the target values representing affective response annotations of the user in response to the temporal windows of token instances;
training a machine learning-based predictor to predict values representing affective response of the user to being exposed to token instances; wherein the training is performed on data comprising the samples, the corresponding target values, and values indicative of the number of token instances in the temporal windows of token instances; and wherein the machine learning-based predictor utilizes the values indicative of the number of the token instances to compensate for non-linear effects resulting from saturation of the user due to the user being exposed to the token instances in the temporal windows of token instances including the token instances originating from the same digital media source and having overlapping instantiation periods.

17. The method of claim 16, wherein the target values are affective response annotations expressed as emotional responses, and the machine learning-based predictor is a machine learning-based emotional response predictor.

18. The method of claim 16, wherein the target values are derived from user measurement channels of the user, and the machine learning-based predictor expresses the predicted response to tokens in terms of values of the user measurement channel of the user.

19. The method of claim 16, further comprising receiving the token instances and a baseline value for the user; and generating the samples from the token instances and the baseline value for the user.

20. A method comprising:
   receiving samples comprising temporal windows of token instances to which a user was exposed; the token instances spread over at least a day, and a subset of the token instances originating from same source and having overlapping instantiation periods;
   receiving target values representing a response of the user to the temporal windows of token instances expressed as values of a measurement channel of the user; and
   training a machine learning-based predictor on input data comprising: the samples, the corresponding target values, and values indicative of the number of token instances in the temporal windows of token instances; wherein the predictor utilizes the values indicative of the number of the token instances to compensate for non-linear effects resulting from saturation of the user due to the user being exposed to the token instances in the temporal windows of token instances including the token instances originating from the same source and having overlapping instantiation periods.

\* \* \* \* \*